(12) United States Patent
Chaulk et al.

(10) Patent No.: US 7,640,496 B1
(45) Date of Patent: Dec. 29, 2009

(54) METHOD AND APPARATUS FOR GENERATING REPORT VIEWS

(75) Inventors: Christopher A. Chaulk, Franklin, MA (US); Mark Clement, Milford, MA (US); Xiaohua Cheng, Shrewsbury, MA (US); Udi Bar-On, Jamaica Plain, MA (US); Paul J. Timmins, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 631 days.

(21) Appl. No.: 10/699,572

(22) Filed: Oct. 31, 2003

(51) Int. Cl.
*G06F 17/00* (2006.01)
*G06F 3/00* (2006.01)

(52) U.S. Cl. .................. 715/243; 715/204; 715/206; 715/788; 715/760; 707/102

(58) Field of Classification Search ............... 715/243, 715/204, 206, 207, 251, 760, 788, 825; 707/102, 707/103 R, 3, 101
See application file for complete search history.

(56) References Cited

U.S. PATENT DOCUMENTS

| | | | |
|---|---|---|---|
| 5,809,266 A * | 9/1998 | Touma et al. ............... 715/764 |
| 6,539,370 B1 * | 3/2003 | Chang et al. ................... 707/2 |
| 6,901,403 B1 * | 5/2005 | Bata et al. ................... 707/101 |
| 6,966,033 B1 * | 11/2005 | Gasser et al. ............... 715/738 |
| 7,039,871 B2 * | 5/2006 | Cronk ......................... 715/741 |
| 7,093,194 B2 * | 8/2006 | Nelson ........................ 715/513 |
| 7,222,130 B1 * | 5/2007 | Cras et al. ............... 707/103 R |
| 2002/0059263 A1 * | 5/2002 | Shima et al. ................. 707/100 |

* cited by examiner

*Primary Examiner*—Tadeese Hailu
(74) *Attorney, Agent, or Firm*—Chapin IP Law, LLC

(57) ABSTRACT

A system produces a storage area network resource management report view by obtaining at least one report definition containing report parameters that specify a report layout for presentation of data in the graphical user interface. The system receives a report request to view data in a report view and obtains a data set corresponding to the report request. The data set includes data values to be presented as the data in the graphical user interface. The system applies the data values in the data set to the corresponding report parameters in the at least one report definition to populate the report layout specified by the at least one report definition to dynamically generate at least one report view. The system provides the at least one report view for rendering in the graphical user interface. The system also provides the ability to create custom report views without requiring programming language skills.

38 Claims, 17 Drawing Sheets

EMC²
where information lives

Links

Reports | Administration

EMC ControlCenter StorageScope™  Version 5.1.2

Home · Help · Logoff

Hide Advanced

Choose Options

Select a date to see all reports available on that date.

Date Selected: Oct 17, 2003

| S | M | T | W | T | F | S |
|---|---|---|---|---|---|---|
| 28 | 29 | 30 | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | 1 |
| 2 | 3 | 4 | 5 | 6 | 7 | 8 |

Graphs are ON
Turn graphs OFF [ill]

Service Consumers

Hosts
- Hosts by Group ← 134
- All Hosts
- Group List
- Chargeback
- Devices
- Shared Devices
- HBAs
- Arrays

- Logical Volumes
- Paths
- File Systems ← 138
- File Systems to Devices
- Databases
- Database Datafiles
- Oracle Tablespaces
- Oracle Parameters
- Volume Groups

133

Backup
- Servers
- Clients
- Data Sets

- Job Details
- Job Errors
- Schedule

Combined Reports
- Group List (All)
- All

- All in Multiple Groups
- All not in a Group

Infrastructure

Arrays
- Arrays by Group
- All Arrays
- Group List
- Device Allocation
- Devices
- Disks

- Ports
- Ports to Devices
- LUN Masking
- Storage Pools
- Replicas

Switches
- Switches by Group
- All Switches
- Group List

- Ports
- Zones

NAS
- File Systems by Group
- All File Systems
- File Systems Group List
- Data Movers
- Data Movers to File Systems

- Servers by Group
- All Servers
- Server Group List
- Exports
- Storage Devices

| Hosts - Basic | | | |
|---|---|---|---|
| Host ▲ | Accessible - Total (GB) | File System - Total (GB) | Database Capacity (GB) |
| 5i | 87.51 | 48.42 | 0.00 |
| losaq059 | 0.00 | 0.00 | 0.00 |
| losaq074 | 58.83 | 15.62 | 0.00 |
| losaq080 | 0.00 | 0.00 | 0.00 |
| losaq111 | 56.28 | 8.46 | 0.00 |

GENERATED REPORT VIEW

| Host ▲ | Accessible - Total (GB) | File System - To... | Capacity (GB) | Vendor | Installed Mem |
|---|---|---|---|---|---|
| 5i | 87.51 | | 0.00 | | |
| losaq059 | 0.00 | | 0.00 | IBM | |
| losaq074 | 58.83 | | 0.00 | Sun Microsystems | |
| losaq080 | 0.00 | | 0.00 | IBM | |
| losaq111 | 56.28 | 8.46 | 0.00 | Microsoft | |

*Fig. 10*

GENERATED REPORT VIEW

Hosts -- My Host List Layout

Report Date Oct 17, 2003 Time 4:08 AM Layout My Host List Layout

Rows 1-5 of 5

| Host ▲ | Accessible - Total (GB) | File System - Total (GB) | Database Capacity (GB) | Vendor | Installed Memory (MB) |
|---|---|---|---|---|---|
| 5i | 87.51 | 48.49 | 0.00 | | 3,968 |
| losaq059 | 0.00 | 0.00 | 0.00 | IBM | 512 |
| losaq074 | 58.83 | 15.62 | 0.00 | Sun Microsystems | 512 |
| losaq080 | 0.00 | 0.00 | 0.00 | IBM | 1,024 |
| losaq111 | 56.28 | 8.46 | 0.00 | Microsoft | 256 |

Rows 1-5 of 5

USER CUSTOM GENERATED REPORT VIEW

*Fig. 15*

METHOD AND APPARATUS FOR GENERATING REPORT VIEWS

BACKGROUND

Graphical user interfaces provide mechanisms for a software application and related processes operating on a computer system to graphically present information to a user of the computer system. There are numerous conventional techniques that a software application can utilize to generate or construct information to be presented within a graphical user interface. As an example, a software program may be configured with software code that produces data, graphics or other information encoded in one or more pages of a markup language such as the hypertext markup language (HTML). A software program such as a browser may display the HTML pages for presentation of the data, graphics or other information to user on computer display or monitor. As another example, a software application may encode information in extensible markup language (XML) in order to allow this information to be transferred to other software applications for various processing purposes. A software application equipped to utilize XML processing technologies can apply an extensible stylesheet language (XSL) stylesheet or an XSL transformation (XSLT) to process or convert a raw XML data source formatted in one manner into an output format that can be displayed on a graphical user interface. As a specific example, XSLT can perform an XML to HTML transformation so that XML encoded data can be displayed within an HTML compatible interface.

There exist various types of conventional software applications that produce large amounts of information and that require the ability to produce reports or summaries of such information for display to users within a graphical user interface. As an example, network management applications operate on computer systems to manage entities with computer and storage area networks. Such management applications store large amounts of data and often require the ability to generate reports on network management data. As a specific example, data storage system developers have integrated large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install and operate one or more distributed storage area network management software applications within the storage area network to manage or administer the various managed entities (i.e., devices, computer systems, data storage systems, etc.) that operate within the storage area network. A network manager or administrator (i.e., a person) responsible for management of the storage area network operates the network management software application to perform management tasks such as performance monitoring, network analysis and remote configuration and administration of the various components operating within the storage area network. A typical conventional storage area network management software application may have several different software components that execute independently of each other on different computer systems but that collectively interoperate together to perform network management. A typical conventional storage area network management application collects vast amounts of management data from the managed entities in the network and stores this data within a managed data repository such a relational database. Using conventional relational database access tools, a user of a conventional storage area network management application can access the relational database in order to produce management reports that visually convey relationships and associations between information stored within the management data relational database.

SUMMARY

Conventional mechanisms and techniques for producing useful information such as reports for display within a graphical user interface suffer from a variety of deficiencies. In particular, conventional report generating approaches that rely on conversion of an XML data source using an XSL stylesheet into a format that can be rendered in a graphical user interface require that the application developer build one or more report generation Java (an object-oriented applications programming language) classes for each report that is to be generated for display within the graphical user interface. As an example, if an XML data source contains financial information and a user desires to see different types of reports concerning various relationships expressed in the data within the financial information, a software developer can use XSL and an XSLT tool to extract the desired data and then creates a Java class for each different type of report that the user desires to view. The Java classes are responsible for formatting the particular extracted XML information from the XML data source for presentation in a report such as a particular table style or graph within the graphical user interface.

As a result of this conventional XML-based report generation approach, application upgrades or changes to report content require the Java source code to be modified each time report layout is to be modified. Furthermore, in order to add new or custom reports to the application, the developer must write new Java classes from scratch or revise the Java source code of an existing report generation class to obtain the desired report. Unless the user is an experienced Java software developer, this can be a significant burden. Furthermore, XML-based processing technologies typically involve reading an entire XML data source into memory in order to be stylized according to the XSL stylesheet. This requirement presents a significant scalability issue since large reports cannot easily be processed in a timely manner for presentation to the user. Further still, the Java code written by developer must take into account formatting issues such as pagination to provide a user-friendly report viewing experience.

In conventional approaches that utilize a relational database to generate reports, the flexibility of such report viewing systems is limited since the application that accesses the data and renders a report within a graphical user interface must be database-aware. That is, the application must be coded with proper query instructions that can access a relational database in the appropriate manner as required for display of information within a report desired by the user. In situations in which the user is remotely located from the database, such access may not be readily available. Further still, this conventional database-driven report generation approach still requires that the user be familiar with database access techniques if that user desires to change report content or layout or generate a new report.

Embodiments of the invention operate to significantly overcome these and other deficiencies associated with conventional mechanisms and techniques for processing of data for generation of reports for presentation within a graphical user interface. In particular, embodiments of the invention provide efficient mechanisms and techniques that produce reports for presentation in a graphical user interface by describing the interface externally to, or separate from, the source code used to dynamically build the interface. This approach allows content creation of data to be displayed in the interface to occur independently of software development of application code to generate reports that include the content. In other words, interface content creation occurs independently of software development.

The interface generation framework defined by embodiments of the invention includes software application code and a set of report definitions. Generally, the report definitions are a set of files defined in a markup language such as XML that contain report parameters that specify a report layout (one or more) for presentation of data in the graphical user interface. The report definitions do not contain the data itself, but rather indicate metadata that describes a layout of the data to be displayed within a graphical user interface. The data for the report is contained within one or more data sets that may be, for example, XML encoded data representing any type of information such as storage area network management information obtained from a relational database repository maintained by a storage area network management application. Embodiments in the invention utilize the report definitions in conjunction with the data sets containing the data to generate and display report views within a graphical user interface.

Generally, in operation, embodiments of the invention provide a report generator software application that is operable to load information in the report definitions files into objects in memory. Then, as a user provides report requests to see dynamically generated report views, the report generator of this invention references report definitions and report parameters defined therein to determine which report view to build, what data to display within that report view (e.g., the particular report layout, titles, column headings, column ToolTips, related reports and the like, as will be explained further), what presentation format to display the report view in (e.g., multi-column tabular, two column tabular, pictorial, in a tree format, and so forth) and what links to other reports should be built within the report view. After dynamic generation, the report generator then causes the report view to be rendered within a graphical user interface for viewing by the user. The report generator thus provides a dynamic transformation process that dynamically (i.e., during runtime) creates a report view representation, such as in HTML or XML or in another output format (e.g., comma separate values or CSV), of data contained in data sets such as XML files referenced by the report definitions that specify the layout and parameters of the report view.

In particular, in one embodiment of the invention, a report generator software application operates to obtain at least one report definition. As noted above, the report definition contains report parameters that specify a report layout for presentation of data in the graphical user interface. The report generator further receives a report request to view data in a report view. The report request may be received, for example, when the user makes a report selection from list of available reports shown in a graphical user interface. The report request from the user expresses a desire to view the particular type of management data report concerning, for example, storage area network management report request, the report generator obtains one or more required data sets corresponding to the report request. Each data set includes data values to be presented as the data in the graphical user interface. The report generator applies the data values in the data set(s) to the corresponding report parameters in the report definition (i.e., for the selected layout), as will be explained, to populate a report layout specified by the report definition to dynamically generate at least one report view. The report generator then displays (or causes a rendering application such as a browser to display) the report view in a graphical user interface. In this manner, by separating report layout information in report definitions from the content or data to be displayed within the report layouts (such data being contained in one or more data sets), embodiments of the invention do not require modification of the report generator application source code in order to alter report content or layout.

The report generator configured according to embodiments of the invention further allows user to create custom or user-defined report views. In one embodiment, this is accomplished by receiving a user custom report layout definition. In particular, the report generator receives a user selection of columns available for inclusion into the user custom report layout and further receives a user sort option by which to sort the user selected columns in the user custom report layout. Graphing and filtering options can also be received as will be explained. The report generator saves the user selection of columns and the user sort option in a user custom report layout (and graphing and filtering options). Thereafter, when user returns to the report selection page, the report generator can receive, from the user, a selection of the user custom report layout for display as a report view on the graphical user interface. In response to the selection of user custom report layout, report generator generates and displays a report view corresponding to the user custom report layout. Alternatively, after creation of a custom user-defined report layout by a user, the report generator can immediately generate and render the report view for that layout.

Embodiments of the invention provide several significant advantages over traditional report generation techniques. As an example, the framework provided by embodiments of the invention and used by the report generator as explained herein is flexible and extensible to allow generation of many different types of report views in many different output formats for use in different rendering environments such as Java, Windows GUI (Graphical User Interface), PDF (Portable Document Format), XML, Comma Separated Value (CSV) and so forth. As such, the report definitions themselves do not restrict the user interface or output format that a user requires. Furthermore, embodiments in the invention are flexible such that data obtained from data sets can be obtained from any number of sources or in different formats. As an example, in one embodiment of the invention the data sets are obtained from a relational database as row sets using a query language such as SQL (Structured Query Language). Alternatively, the data sets can be formatted in a markup language such as XML based on data extracted from a database, for example.

Another advantage of embodiments of the invention is that the mechanisms and techniques explained herein provide generation of an interface that can change dynamically based on the current state of the report definitions. This allows development of the interface to continue incrementally with inclusion of new content being an automatic process without requiring modification of report generator application source code. A user is able to define a new report as explained herein and is able to easily add a link to the report from a report selection page. When this is complete, the report generator of this invention dynamically generates all report content as requested.

Modifying or replacing report definition files as opposed to creating new source code allows easier application upgrades that may be required to create new report views. Furthermore, embodiments of the invention provide intelligent scalability during presentation of report information in report views for example by calculating report content and providing, for example, a graphical as well as tabular view of report content. The report generation approach provided by embodiments of the invention largely separates development responsibilities of the Java developer who is responsible for creating source code from other users such as network managers who can operate as content developers by describing and defining report content by introducing custom report definitions without necessarily having knowledge of how the interface produces the report views that are built and rendered. The design of the invention thus reduces costs and complexities required to produce a new report.

Other embodiments of the invention include computerized devices, such computer systems, workstations or other devices configured or operable to process and perform all of the method operations disclosed herein as embodiments of the invention. In such embodiments, a computer system includes a memory system, a processor, a communications interface and optionally a display and an interconnection mechanism connecting these components. The memory system is encoded with a report generator application that when performed on the processor, produces a report generator process that operates as explained herein to perform all of the method embodiments and operations explained herein as embodiments of the invention.

Other arrangements of embodiments of the invention that are disclosed herein include software programs to perform the method embodiment steps and operations summarized above and disclosed in detail below of the report generator process. More particularly, a computer program product is disclosed that has a computer-readable medium including report generator computer program logic encoded thereon that when performed in a computerized device provides operations of the report generator application and process as respectively explained herein. The computer program logic, when executed on at least one processor with a computing system, causes the processor to perform the operations (e.g., the methods) indicated herein as embodiments of the invention. In addition, the report definitions explained herein when encoded on a computer readable medium represent embodiments of the invention as well. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM (Read Only Memory or RAM (Random Access Memory) or PROM (Programmable Read Only Memory) chips or as an Application Specific Integrated Circuit (ASIC) or as downloadable software images in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or processes such as the report generator process can execute on a dedicated computer alone and the report definitions can be remotely accessed. The report generator may be integrated into a storage area network management application as well.

It is to be understood that the system of the invention can be embodied strictly as a software program, as software and hardware, or as hardware alone. Example embodiments of the invention may be implemented within EMC's Control Center and StorageScope software application(s) that provide management functionality for storage area network resources and in computerized devices that operate the Control Center software. ControlCenter and StorageScope are trademarks of products manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 8 is an example screen shot of a report selection interface configured in accordance with embodiments of the invention.

FIG. 9 is an example screen shot of an example generated report view 141 configured in accordance with embodiments of the invention.

FIG. 10 is an example screen shot of a pull-down menu interface allowing selection of various report generation options configured in accordance with embodiments of the invention.

FIG. 15 is an example screen shot of a user-defined custom report view interface showing a tabular view configured in accordance with embodiments of the invention.

DETAILED DESCRIPTION

Figure 1:
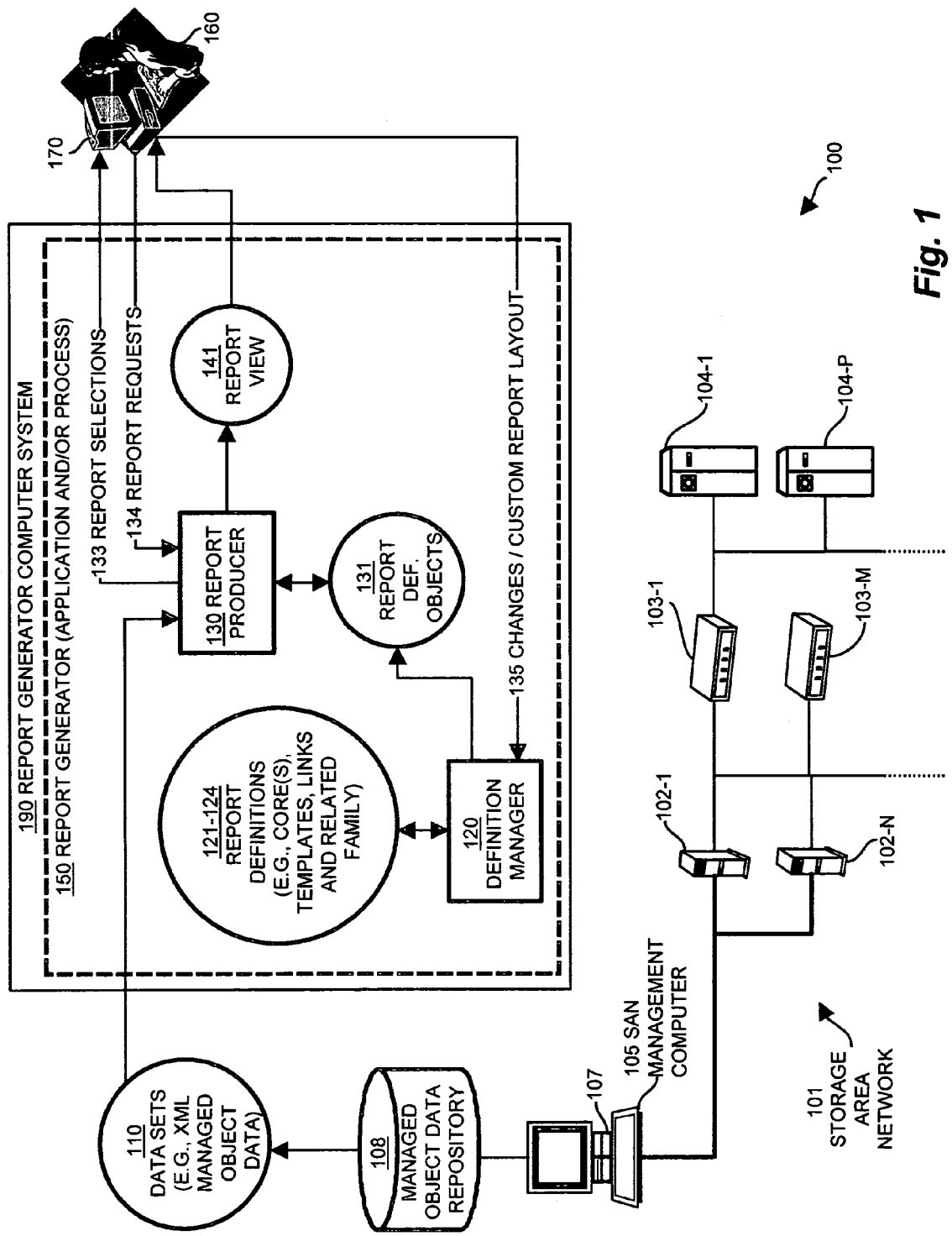
FIG. 1 illustrates an example of a report generator application and process operating to produce report views from data sets collected from storage area network management data from a storage area network management application according to embodiments of the invention.

Generally, embodiments of the invention provide efficient mechanisms and techniques to define and produce reports for presentation in a graphical user interface by describing the interface externally to, or separate from, any source code used to dynamically build the interface. This is accomplished by providing a set of report definitions that a user can easily create and manipulate to define report parameters that express report layouts for presentation of data in a graphical user interface. The report layouts built from report parameters reference or correspond to data contained in one or more data sets such as XML encoded data extracted from a storage area network management application repository. The report generator program configured in accordance with embodiments of the invention can process the report definitions and present a series of selectable reports corresponding to each report layout defined in the set of report definition files for selection of a specific report view from a user. Upon selection of a report view by a user, the report generator applies report layouts template information contained within report definitions (i.e., matches report parameters) to the appropriate data from data sets corresponding to those report layouts in order to dynamically and automatically generate a report view corresponding to the report layouts selected by the user. The report generator can display the resultant dynamically generated report view on a graphical user interface. The report creation and generation framework provided by embodiments of the invention allows content creation of data to be displayed in the interface to occur independently of software development of application code to generate reports that include the content. In other words, interface content creation occurs independently of software development.

The interface generation framework defined by embodiments of the invention includes report generator software application code and a set of report definitions. Generally, the report definitions are a set of files defined in a markup language such as XML that contain report parameters that specify a report layout (one or more) for presentation of data in the graphical user interface. The report definitions do not contain the data itself, but rather indicate metadata that describes a layout of the data to be displayed within a graphical user interface. The data for the report is contained within one or more data sets that may be, for example, XML encoded data representing any type of information such as storage area network management information obtained from a storage area network management application. Example contents of report definitions and data sets to which report layouts defined in those report definitions may be applied are provided below. Embodiments in the invention generally utilize the report definitions in conjunction with the data sets containing the data to generate and display report views within a graphical user interface.

Embodiments of the invention thus provide a report generator software application that is operable to load information in the report definitions files into objects in memory. Then, as a user provides report requests to see generated report views, the report generator references report layout definitions and report parameters defined therein to determine, from a report layout, which report view to build, what data to display within that report view (e.g., the particular report layout, titles, column headings, column tool tips, related reports and the like, as will be explained further), what presentation format to display the report view in (e.g., multi-column tabular, two column tabular, pictorial, in a tree format, and so forth) and what links to other reports should be built within the report view. A user is also able to identify related reports and the report view generated by the report generator can include the ability for a user to select related reports in a report group many. The report generator then causes the report view to be rendered within a graphical user interface for viewing by the user. The report generator thus provides a dynamic transformation process that creates a report view representation, such as in HTML, of data contained in data sets such as XML files referenced by the report definitions that specify the layout and parameters of the report view.

FIG. 1 illustrates an example of a computing system environment 100 suitable for use in explaining example operations of embodiments of the invention. In FIG. 1, a storage area network 101 (SAN) includes a plurality of host computer systems 102-1 through 102-N that interconnect through connectivity devices 103-1 through 103-M (e.g., SAN switches) to a number of data storage systems 104-1 through 104-P. A storage area network management computer system 105 is coupled to the storage area network 101 and operates a storage area network management application 107 that a network administrator can use to manage that various hosts 102, connectivity devices 103 and data storage systems 104. Operation of the storage area network management application 107 includes collection of management data concerning the operation and performance of the components in the storage area network 101. The storage area network management application 107 stores this information as managed object data 108 in a repository such as a relational database. A report generator software program 150 operating on a report generator computer system 190 (generally referred to herein as report generator 150) can access data sets 110 (e.g., as XML managed object data sets in the illustrated example) produced from the managed object data 108 as explained herein to produce management reports in the form of report views 141 for viewing by a user 160 of the report generator 150 on a display of a user computer system 170. Note that in one embodiment, the report generator computer system 190 can be the same computer system as the storage area network management computer system 105 and the report generator 150 can be part of (e.g., a module, library or software component of) the storage area network management application 107. Prior to explanation of the details of this processing, some details of the report generator 150 and associated data will be provided to assist in understanding further embodiments of the invention.

The report generator 150 in FIG. 1 includes a definition manager 120 and a report producer 130. These generally represent software processing logic or code that operate as explained herein to produce the report views 141 for viewing by the user 160. The definition manager 120 manages creation of a set of report definitions 121 through 124. Generally, the report definitions 121 are a series of files, such as XML files, that contain report layouts and other information and metadata that describes the layout of a report view 141, without containing the particular actual data to be displayed within the report view 141. According to embodiments of the invention, the report definitions include core report definitions 121, and structure report definitions such as a template definition 122, a link definition 123 and a related family definition 124. These report definitions can exist as files within persistent storage in the report generator computer system 190.

Core report definitions files 121 contain core report layouts that correspond to each individual report request 134 that a user 160 can provide to the report producer 130. As an example with respect to the storage area network environment 101 illustrated in FIG. 1, there can be five different core report definitions files 121. That is, the series of storage area network core report definitions 121 define report layouts for five different classes of reports that can be viewed concerning storage area network managed resources. Each report layout (there may be many report layouts in a single core report definition file 121) identifies arrangements of report parameters including, for example, a report name, report columns and characteristics of a report for a storage area network resource. There can be respective core report definitions files to contain report layouts for report views for host computer systems, host file systems, data storage system arrays, storage switches, network attached storage and the like. In particular, the five core report definitions files 121 corresponding to the five major object types contained within the managed object data repository 108 applicable to report generation within a storage area network environment are as follows:

Core Report Definition Files

| | |
|---|---|
| 1. HostDef.xml | A hosts core report definition |
| 2. ArrayDef.xml | A data storage system core report definition |
| 3. FileServerDef.xml | A file server core report definition |
| 4. SwitchDef.xml | A storage switch core report definition |
| 5. NASFileSystemDef.xml | A network attached storage system core report definition. |

A short example of some of XML content showing a report layout contained within a core report definition file configured in accordance with embodiments of the invention for the HostDef.xml file is show below. Note that line numbers have been added to this example below for referential purposes only.

HostDef.xml (snippet) 121:
500: <ReportDefinition name="HostByGrp">
501: <Template>STS_HOST_BY_GROUP_Template</Template>
502: <ReportType>table</ReportType>
503: <RelatedFamily>HostByGrp</RelatedFamily>
504: <FilterColumn>
505: <Name>GRP_PARENT_ID</Name>
506: <IsContainsFilter>false</IsContainsFilter>
507: </FilterColumn>
508: <ReportColumn name="GRP_PARENT_ID"/>
509: <ReportColumn name="GRP_NAME"/>
510: <ReportColumn name="GRP_SUBGRPCOUNT"/>
511: <ReportColumn name="GRP_HOSTCOUNT"/>
512: <ReportColumn name="HOST_ARRAY_ALLOC_PRI"/>
513: <ReportColumn name="HOST_ARRAY_REP_TOTAL"/>
514: <ReportColumn name="HOST_INTDISK_TOTAL"/>
515: </ReportDefinition>

In the above example, a report definition (i.e., a single report layout) within the host core report definition file begins at line 500 and ends at line 515 and is called "HostByGrp". Line 501 of this report layout identifies a template within a template structure definition file (to be explained shortly) that identifies attributes associated with report parameters defined in the remainder of the report layout. The report parameters are defined in subsequent lines by a report parameter tag and a corresponding value. Line 502 indicates that the report layout type is (i.e., will be when rendered) a table and line 503 identifies a related family report that indicates what other report layouts are related to this report. In this example, the related family tag refers to HostByGrp or in other words, this report layout itself. That is to say this example report layout does not have other related family report layouts other than itself. Lines 504 through 507 indicate a column name (line 505) by which to filter information contained in a tabular report view generated that will be generated (as explained shortly) from this report definition. Line 506 indicates the column to filter data upon and line 507 indicates a filter condition that is "false" in this example. Lastly in this example, lines 508 through 514 define various columns to be contained within a report view 141 generated from this report layout in tabular form. In this example, this example report layout thus defines a table having seven columns, no related reports, and the first column "GRP_PARENT_ID" is to be used as a filter column during report generation as to be explained.

Note that in the above example host report definition file, only a single report layout was provided by way of example only. It is to be understood that there may be numerous other report layouts (delineated by the ReportDefinition begin and end tags) contained within this HostDef.xml file that provide report layout definitions for various other reports views 141 that can be used to present host data to the user 160. Furthermore, it is to be understood that the other report definition files relating to data storage system arrays, file systems, switches, network attached storage and the like contain other report definitions define report layouts in their respective files as well.

In addition to core report definition files, embodiments of the invention also provide a set of structure definition files that include a template definition file 122, a link definition file 123 and a related family definition file 124. The template definition file 122 defines report definition or layout templates for each report layout defined in the series of core report definitions 121 explained above. As an example, the report definition template file 122 can contain metadata including column values names and data types for report columns identified in each report layout defined in the core report definition files. An example of a snippet of XML content from a template definition file configured in accordance with one example embodiment of the invention is shown below:

Template.xml (snippet) 122:
600: <ReportDefinition name="STS_HOST_BY_GROUP_Template">
601: <TableName>STS_HOST_BY_GROUP</TableName>
602: <ReportColumn name="GRP_ID">
603: <Type>id</Type>
604: </ReportColumn>
605: <ReportColumn name="GRP_NAME">
606: <Type>varchar</Type>
607: </ReportColumn>
601: <ReportColumn name="GRP_PARENT_ID">
608: <Type>id</Type>
609: </ReportColumn>
610: <ReportColumn name="GRP_PARENT_PATH">
611: <Type>varchar</Type>
612: </ReportColumn>
613: <ReportColumn name="GRP_SUBGRPCOUNT">

```
614: <Type>numeric</Type>
615: </ReportColumn>
616: <ReportColumn name="GRP_HOSTCOUNT">
617: <Type>numeric</Type>
618: </ReportColumn>
619: <ReportColumn name="HOST_ARRAY_ALLOC_PRI">
620: <Type>capacity</Type>
621: </ReportColumn>
622: <ReportColumn name="HOST_ARRAY_REP_TOTAL">
623: <Type>capacity</Type>
624: </ReportColumn>
625: <ReportColumn name="HOST_INTDISK_TOTAL">
626: <Type>capacity</Type>
627: </ReportColumn>
628: <ReportColumn name="HOST_ARRAY_REPLOCAL_TOTAL">
629: <Type>capacity</Type>
630: </ReportColumn>
631: <ReportColumn name="HOST_ARRAY_REPREMOTE_TOTAL">
632: <Type>capacity</Type>
633: </ReportColumn>
634: <ReportColumn name="HOST_USED">
635: <Type>capacity</Type>
636: </ReportColumn>
637: <ReportColumn name="HOST_ARRAY_ACCESSIBLE">
638: <Type>capacity</Type>
639: </ReportColumn>
640: <ReportColumn name="FS_TOTAL">
641: <Type>capacity</Type>
642: </ReportColumn>
643: <ReportColumn name="FS_USED">
644: <Type>capacity</Type>
645: </ReportColumn>
646: <ReportColumn name="VG_TOTAL">
647: <Type>capacity</Type>
648: </ReportColumn>
649: <ReportColumn name="VG_USED">
650: <Type>capacity</Type>
651: </ReportColumn>
652: <ReportColumn name="DB_TOTAL">
653: <Type>capacity</Type>
654: </ReportColumn>
655: <ReportColumn name="DB_USED">
656: <Type>capacity</Type>
657: </ReportColumn>
658: </ReportDefinition>
```

The example template structure definition file 122 above contains all of the report definition templates and each template defines the underlying database tables columns and data types. Essentially, the template definition file identifies a set of tagged data that applied to a particular report definition layout by report definition name (line 600) and then begins by providing a table report (line 601) to be display by the table and then defines information for each column of the table (from lines 602 through 657) with a column name and data type attributes for data values that will be displayed in the column of the report view 141. The template thus indicates further details concerning the layout of a particular report layout, but again does not provide the actual data values.

In addition to the template structure definition file 122, the structure definition files also include a link definition file 123 that defines linkable report columns and link targets for report definition templates defined in the template definition, thus allowing report dependencies to exist between reports views 141. An example of content of a link definition file 123 is as follows:

Links.xml (snippet) 123:
```
670: <ReportDefinition name="STS_HOST_BY_GROUP_Template">
671: <ReportColumn name="GRP_SUBGRPCOUNT">
672: <TargetReportDefName>this</TargetReportDefName>
673: <ColumnSend>GRP_ID</ColumnSend>
674: </ReportColumn>
675: <ReportColumn name="GRP_HOSTCOUNT">
676: <TargetReportDefName>HostList</TargetReportDefName>
677: <ColumnSend>GRP_ID</ColumnSend>
678: </ReportColumn>
679: </ReportDefinition>
```

As shown at line 670 in the links definition file 123 above, the links appearing in lines 671 through 678 apply to the STS_HOST_BY_GROUP report view and will describe two columns that are to be presented to the user as hyperlinks to allow the user to navigate between reports. In particular, at line 671, the report column corresponding to GRP_SUBGRPCOUNT in the STS_HOST_BY_GROUP report layout is to be shown or rendered as a hyperlink to the target report indicated as "this", which according to this embodiment of the invention is a link to itself (i.e., a link to its own report layout). As defined at line 675, the second column labeled GRP_HOSTCOUNT in the STS_HOST_BY_GROUP report layout is to contain data values that are hyperlinks to a target report defined at line 676 having the name HostList. Using the links file 123, embodiments of the invention allow a user to create hyperlinks for data values expressed in one report view 141 to allow the user to quickly navigate to view other reports of interest.

Yet another structure report definition file provided according to embodiments of the invention is the related family report definition file 124. A snippet of XML from a related family report definition file 124 configured in accordance with one example embodiment of the invention is shown below:

RelatedFamily.xml (snippet) 124:
```
680: <RelatedFamily name="HostByGrp">
681: <SelectType>options</SelectType>
682: <RelatedView name="Basic">
683: <ViewName>HostByGrp</ViewName>
684: </RelatedView>
685: <RelatedView name="Allocation Details">
686: <ViewName>HostByGrpAllocDetail</ViewName>
687: </RelatedView>
688: <RelatedView name="Utilization Details">
689: <ViewName>HostByGrpUtilDetail</ViewName>
690: </RelatedView>
691: </RelatedFamily>
```

A related family definition such as that shown above defines at least one related grouping of report layouts that specifies related report layouts that may be selected for viewing by a user when viewing a report view 141 corresponding to a report layout in the related grouping of report layouts. In the above example, there are three related report views they can be displayed within a pull-down menu when the user is viewing the HostByGrp report (defined at line 680). In particular, line 682 defines a Basic report layout and this report layout references itself as defined at line 683. In addition, at line 685, the second related report name AllocationDetails can be displayed in the related report pull-down menu and if selected by the user, will refer the user to a report defined at line 686 as HostByGrpAllocDetail. Likewise, line 688 defined in third related report called UtilizationDetails that, if selected by a user will refer the user to a report view defined at line 689 called HostByGrpUtilDetail. In this manner, the related family definition file allows an interface creator to define the ability to allow a user viewing one report view 141 to pull-down a related report menu in order to quickly navigate to other related reports as defined in the related family structure definition file 124.

From reviewing the above XML examples of core definition files 121 and structure definition files 122 through 124 (121 through 124 being collectively referred to as report definition files), those skilled in the art will understand the referential nature of these file to each other. In particular, the core report definition files 121 define the general report layouts to be presented as report views 141 to the user 160 in a report selection interface (e.g., a report selection home page, to be explained shortly). The template structure definition file 122 defines the particular attributes of data fields and columns and tables associated with columns in a particular report view defined in the core definition files 121. The links definition file 123 identifies one or more columns of a particular report layout that are to be indicated within a report view 141 as hyperlinked to other reports that may be of interest to the user 160. The related family structure definition file 124 defines what related reports the user can access when viewing a particular report view 141 from a pull-down menu or other selection mechanism. Note that in all of these report definition files 121 through 124, the actual management data values are not included.

Referring back to FIG. 1, the management data itself is stored within a set of data sets 110 which in this illustrated example, are XML files containing XML formatted managed object data extracted from the managed object data repository 108. A short partial example of a data set 110 containing XML encoded managed object data configured in accordance with one example embodiment of the invention that contains data values corresponding to the report parameters in the aforementioned example XML report definition files 121 through 124 is shown below. Please note that this example XML data set segment extracted from a data asset 110 has been shortened for brevity in this example. Also note that lines numbers have only been added at certain locations of particular interest to this discussion to further the aforementioned examples of the report definition files.

EXAMPLE DATA SET 110 SNIPPET (below):
```
<?xml version="1.0" encoding="UTF-8" ?>
: <ROOT>
  : <METADATA>
    <DATABASEOBJECT>STS_HOST_LIST</DATABASEOBJECT>
    <VERSION>1.2</VERSION>
    <TIMESTAMP>2003-10-17T08:08:01-04:00</TIMESTAMP>
  </METADATA>
700: <ROWSET>
701: <ROW ID="1">
    <HOST_ID>8502</HOST_ID>
    <HOST_ALIAS>5i</HOST_ALIAS>
    <HOST_NAME>5i</HOST_NAME>
    <HOST_DOMAIN>00b0d0681809</HOST_DOMAIN>
    <HOST_MODEL>X86</HOST_MODEL>
    <HOST_IP>172.23.145.224</HOST_IP>
    <HOST_VENDORNAME NULL="TRUE"/>
    <HOST_CPUCOUNT>4</HOST_CPUCOUNT>
    <HOST_INSTALLEDMEMORY>3968</HOST_INSTALLEDMEMORY>
    <HOST_OS>Windows 2000</HOST_OS>
    <HOST_OSRELEASE>5.0</HOST_OSRELEASE>
    <HOST_OSLEVEL>Service Pack 3</HOST_OSLEVEL>
    <HOST_OSCLASS>Windows</HOST_OSCLASS>
    <HOST_USED>48.4883136749267578125</HOST_USED>
    <HOST_HDCOUNT>5</HOST_HDCOUNT>
    <HOST_PPDEVCOUNT>0</HOST_PPDEVCOUNT>
    <HOST_FSCOUNT>6</HOST_FSCOUNT>
    <HOST_DBCOUNT>0</HOST_DBCOUNT>
    <HOST_TOTAL_STORAGE_ACCESSIBLE>87.50895023345947265625</HOST_TOTAL_STORAGE_ACCESSIBLE>
    <HOST_ARRAY_ACCESSIBLE>79.03656005859375</HOST_ARRAY_ACCESSIBLE>
    <HOST_INTDISK_TOTAL>8.47239017486572265625</HOST_INTDISK_TOTAL>
    <HOST_ARRAY_TOTAL>90.6097412109375</HOST_ARRAY_TOTAL>
    <HOST_ARRAY_REPLOCAL_TOTAL>0</HOST_ARRAY_REPLOCAL_TOTAL>
    <HOST_ARRAY_REPREMOTE_TOTAL>11.58782958984375</HOST_ARRAY_REPREMOTE_TOTAL>
    <HOST_ARRAY REP_TOTAL>11.58782958984375</HOST_ARRAY_REP_TOTAL>
702:
    <HOST_ARRAY_ALLOCATED_PRI>79.02191162109375</HOST_ARRAY_ALLOCATED_PRI>
    <VG_TOTAL>87.4962902069091796875</VG_TOTAL>
    <VG_FREE>34.8439979553222265625</VG_FREE>
    <VG_USED>52.6522922515869140625</VG_USED>
    <DB_TOTAL>0</DB_TOTAL>
    <DB_FREE>0</DB_FREE>
    <DB_USED>0</DB_USED>
    <FS_TOTAL>48.4883136749267578125</FS_TOTAL>
703:
    <FS_FREE>38.93878936767578125</FS_FREE>
    <FS_USED>9.5495243072509765625</FS_USED>
    <GRP_LIST NULL="TRUE"/>
    <HOST_ADCOUNT>4</HOST_ADCOUNT>
    <LVOL_FREE>4.1484375</LVOL_FREE>
    <LVOL_TOTAL>52.6367511749267578125</LVOL_TOTAL>
    <LVOL_USED>48.4883136749267578125</LVOL_USED>
    <HOST_ALLDCOUNT>5</HOST_ALLDCOUNT>
  </ROW>
: <ROW ID="2">
    <HOST_ID>8724</HOST_ID>
    <HOST_ALIAS>Iosaq074</HOST_ALIAS>
    <HOST_NAME>Iosaq074</HOST_NAME>
    <HOST_DOMAIN>lss.emc.com</HOST_DOMAIN>
    <HOST_MODEL>sun4u</HOST_MODEL>
    <HOST_IP>172.23.149.74</HOST_IP>
```

```xml
<HOST_VENDORNAME>Sun
    Microsystems</HOST_VENDORNAME>
<HOST_CPUCOUNT>2</HOST_CPUCOUNT>
<HOST_INSTALLEDMEMORY>512</HOST_
    INSTALLEDMEMORY>
<HOST_OS>Solaris 2.8</HOST_OS>
<HOST_OSRELEASE>2.8</HOST_OSRELEASE>
<HOST_OSLEVEL>Generic__108528-19
    </HOST_OSLEVEL>
<HOST_OSCLASS>UNIX</HOST_OSCLASS>
<HOST_USED>15.6203327178955078125
    </HOST_USED>
<HOST_HDCOUNT>50</HOST_HDCOUNT>
<HOST_PPDEVCOUNT>0</HOST_PPDEV-
    COUNT>
<HOST_FSCOUNT>1</HOST_FSCOUNT>
<HOST_DBCOUNT>0</HOST_DBCOUNT>
<HOST_TOTAL_STORAGE_ACCES-
    SIBLE>58.83167934417724609375
    </HOST_TOTAL_STORAGE_ACCESSIBLE>
<HOST_ARRAY_ACCESSIBLE>
    41.9622802734375</HOST_ARRAY_
    ACCESSIBLE>
    <HOST_INTDISK_TOTAL>
    16.86939907073974609375</HOST_
    INTDISK_TOTAL>
    <HOST_ARRAY_TOTAL>54.88677978515625
    </HOST_ARRAY_TOTAL>
    <HOST_ARRAY_REPLOCAL_
    TOTAL>0.091552734375</HOST_
    ARRAY_REPLOCAL_TOTAL>
    <HOST_ARRAY_REPREMOTE_
    TOTAL>13.78509521484375</HOST_
    ARRAY_REPREMOTE_TOTAL>
    <HOST_ARRAY          REP_TOTAL>
    13.87664794921875</HOST_ARRAY_
    REP_TOTAL>
    <HOST_ARRAY_ALLOCATED_
    PRI>41.0101318359375</HOST_ARRAY_
    ALLOCATED_PRI>
<VG_TOTAL>0</VG_TOTAL>
<VG_FREE>0</VG_FREE>
<VG_USED>0</VG_USED>
<DB_TOTAL>0</DB_TOTAL>
<DB_FREE>0</DB_FREE>
<DB_USED>0</DB_USED>
<FS_TOTAL>15.6203327178955078125</FS_
    TOTAL>
<FS_FREE>10.6572895050048828125</FS_FREE>
<FS_USED>4.963043212890625</FS_USED>
<GRP_LIST NULL="TRUE"/>
<HOST_ADCOUNT>49</HOST_ADCOUNT>
<LVOL_FREE>0</LVOL_FREE>
<LVOL_TOTAL>0</LVOL_TOTAL>
<LVOL_USED>0</LVOL_USED>
<HOST_ALLDCOUNT>44</HOST_ALLDCOUNT>
</ROW>
: <ROW ID="3">
    <HOST_ID>8733</HOST_ID>
    <HOST_ALIAS>Iosaq059</HOST_ALIAS>
    <HOST_ADCOUNT>0</HOST_ADCOUNT>
    . . .
    . . . (data set portions removed from this area to shorten
    this example)
    . . .
    <LVOL_FREE>0</LVOL_FREE>
    <LVOL_TOTAL>0</LVOL_TOTAL>
    <LVOL_USED>0</LVOL_USED>
    <HOST_ALLDCOUNT>0</HOST_ALLDCOUNT>
    </ROW>
</ROWSET>
</ROOT>
```

A brief examination of the XML data within the above example snippet of dataset 110 indicates that data values for all rows of a table of data value can be encoded using XML tags that each correspond to a short description of the columns containing those data values for each row in the table that this data represents. Some of these column tags in the data sets 110 correspond exactly to the names of the report parameter columns defined within the report layouts contained within the core report definition files 122 explained above. As an example, in the XML dataset example 110 shown above, the row set of data extracted from the repository 108 begins at line 700 and the first row begins at line 701. Each column of the first row of data contains a corresponding data value proceeded before and after with a column tag that identifies the name of the column in which that data value appeared in the repository 108. As a specific example, looking at reference numbers 702 and 703 in the above XML data set example, the tags HOST_ARRAY_ALLOC_PRI (reference 702 in the above example) and FS_FREE (703 above) are used to indicate or "tag" a data value for the column corresponding to those tag names for the particular row in which the data value is contained in a table within the repository of managed object data 108 (FIG. 1).

Specifically, for this first row, HOST_ARRAY_ALLOC_PRI has a data value of 79.02191162109375. Of particular importance to the explanation of embodiments of invention, the tag HOST_ARRAY_ALLOC_PRI at location 702 in the example data set 110 above precisely matches the report parameter column labeled HOST_ARRAY_ALLOC_PRI at line 512 in the report layout "HostByGrp" in the above example Host Definition core report file 121 as previously discussed. According to embodiments of the invention, all report parameter tags within the report layouts defined in the core report definition files 121 (as well as tags in the template, link and related family files) match tags in the XML data sets 110. As will be explained, this report parameter matching tag information allows the report producer 130 within the report generator 150 to apply, map or otherwise match XML data within the data sets 110 to the report definitions 121 (expressed as report definition objects 131 as will be explained) in order to extract the appropriate data values from the data sets 110 for generation of a user selected report view 141.

Further details of this processing will now be explained with respect to the flowchart of processing steps illustrated in FIG. 2.

Figure 2:
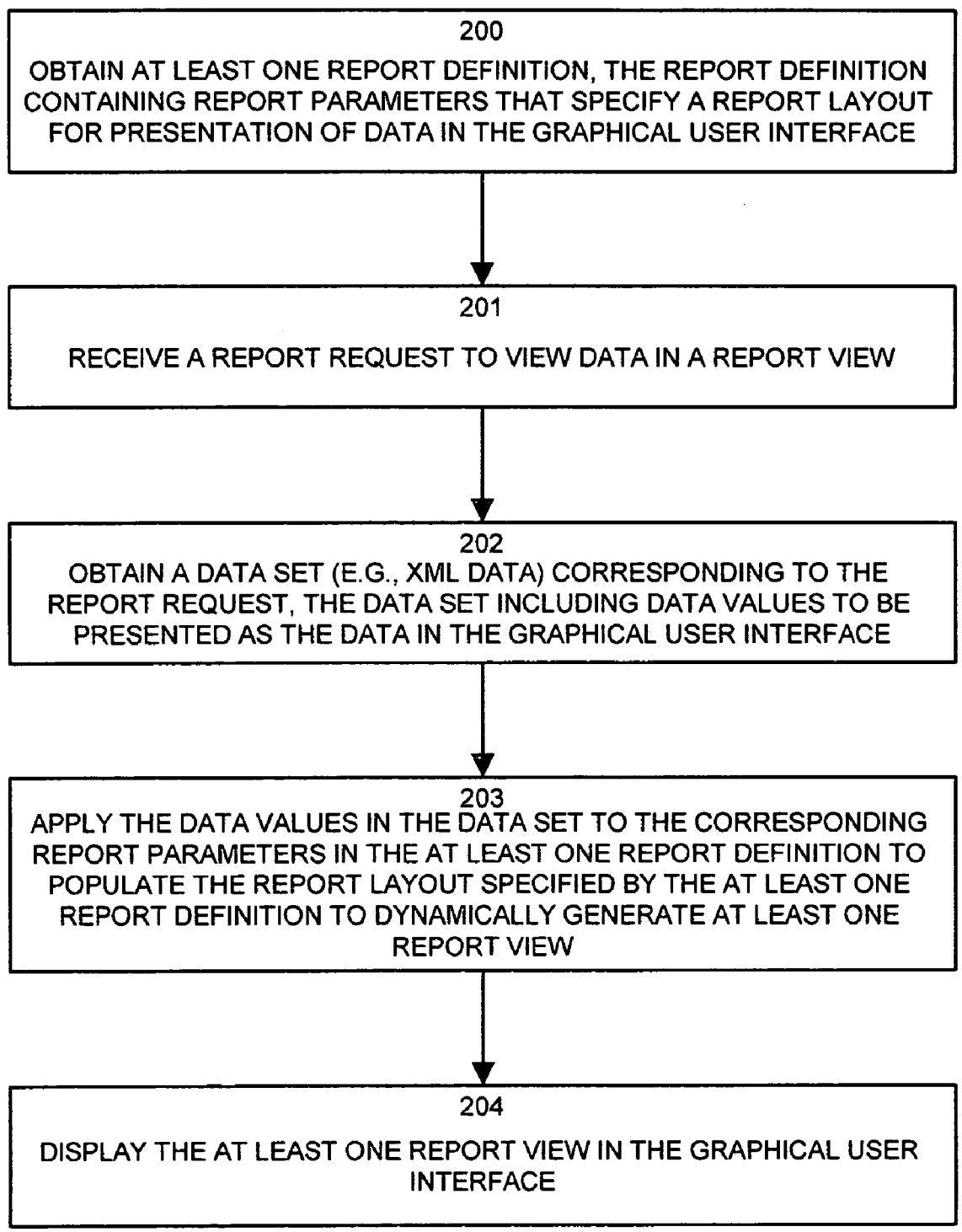
FIG. 2 is a flow chart of processing steps performed by a report generator to produce a report view using report definition files and data sets in accordance with embodiments of the invention.

FIG. 2 is a flowchart of high-level processing steps that illustrate processing operations performed by a report generator 150 configured in accordance with one example embodiment of the invention. After an explanation of the processing steps illustrated FIG. 2 is provided, a more detailed analysis of processing performed by the report generator 150 in accordance with various alternative embodiments of invention will be explained thereafter.

In step 200, the report generator 150 operates the definition manager 120 to obtain at least one report definition (i.e., 121 through 124). The report definition(s) files contain report parameters that specify a report layout for presentation of data in a graphical user interface, such as that on the user computer system 170. In particular, and as will be explained more detailed shortly, the definition manager 120 generally operates to access the report definitions 121 through 124 and parse this XML information to produce a set of report definition objects 131 (e.g., Java objects) that define report layouts for the various report views 141 expressed within the core report definition files 121 as explained above. The report definition objects 131 may be, for example, a set of Java objects or other data structures that are capable of containing data values for the various portions of information to find within the report layouts as explained above. Once the definition manager 120 has parsed the report definitions and converted his information to report definition objects 131, processing can begin generation of report views 141 as explained next.

In step 201, the report generator 150 operating the report producer 130 can present a set of report selections 133 to the user 160 on a display of the user computer system 170 and in response, can receive a report request 134 to view data in a particular report view 141. In other words, report producer 130 can review the set of report definition objects 131 and can identify each report definition layout expressed within the core report definition files 121 as explained above and can present these as a set of selectable report selections 133 to the user 160. This allows the user to select which report layout he or she desires to view as a report view 141. The user 160 makes his or result.

Advancing briefly ahead, FIG. 8 is an example screenshot of a report selection interface 910 configured according to one embodiment of the invention. As shown in the interface in FIG. 8, after parsing the report definition files 121 through 124, the report generator can provide a list of selectable report selections 133. Each report selection shown in the list in the interface 910 is a hyperlink to a URL that indicate the particular report layout from which the user desires to view a corresponding report view 141. Note that the report generator can group certain report selections together based on their existence as report layouts in corresponding core definition files 121 such as the five categories of core definition files explained above.

Returning attention now back to the flow chart of processing steps in FIG. 2, in step 202, in response to receiving a report request 134, the report generator 150 (i.e., the report producer 130) obtains a data set 110 corresponding to the report request 134. The data set 110, as explained above, includes data values to be presented as the data (i.e., within a report view 141 defined by report layout in one of the core report definition files 121) in the graphical user interface on the user's computer system 170. Depending upon which report request 134 the user 160 provides, the report producer 130 can identify the appropriate data set 110 to be retrieved.

Next, in step 203 in report producer 130 applies the data values in the data set 110 to the corresponding report parameters in the report definition (i.e., in the report layout within the core report definition files 121 corresponding to the report request 134 received from the user 160) to populate the report layout specified by the report definition to dynamically generate at least one report view 141. The template report definition file is used here as well to match data types and column names. In other words, the report producer 130 can match column tags of row set data within the data sets 110 of interest to the column tags defined in the report layout corresponding to the user's report request 134 (report layouts being defined within the core report definition files 121) and for each matching tag and report parameter value in the report layout and the data set 110, the report producer 130 can extract and store the data value in a data structure representing the report view 141.

As will be explained in detail shortly, this processing includes extracting data values from the data set 110 using, for example, a database query language processing technique or a markup language transformation processing technique. According to one embodiment of invention, the report producer 130 can use an XML parser such as a SAX (Simple API for XML) parser to traverse or otherwise process a potentially very large XML managed object data set 110 without having to read the entire XML file into memory in order to efficiently extract or otherwise retrieve the appropriate data values for inclusion into the report view 141. In this manner, the report producer 130 does not require consumption of extensive processing resources such as memory in order to parse an entire data set 110 for XML processing using, for example, an XML document object model (DOM) processing engine. The report generator processes the data values to produce, for example, a graphical view of relationships expressed within the data values. The graphical view may include, for example, a tree view and/or a table view and/or a pictorial view of the relationships between the data values such as a histogram chart or pie chart. The report generator 150 may also store the graphical view of the relationships as a report view file in a markup language or other output format for exporting to another application. The markup language format output by the report generator as a report view 141 may be, for example, hypertext markup language (HTML), extensible markup language (XML), and/or a comma separated value (CSV) markup language format.

Next, in step 204 in this example embodiment, the report producer 130 operating within the report generator application 150 displays the report view 141 (i.e., causes the view to be generated, and thus displayed in this example) in the graphical user interface of the user computer system 170. The report view 141 may be created, for example, as HTML for rendering within a browser operated by the user 160.

Advancing briefly ahead in the figures, FIG. 9 illustrates an example of a generated report view 141 showing All Hosts in a Basic format based on receiving a user report request 134 for "All Hosts" from the interface in FIG. 8. As can be seen in FIG. 9, the report view 141 includes a table with columns showing various host information for a Host report layout defined in the HostDef.xml core report definition file 121. Note that the example report view 141 shown in FIG. 9 does not correspond to the definition file 121 as explained above.

In this manner, the report generator 150 is able to produce a report view 141 using processing logic within the report producer 130 that requires no modification to application source code while at the same time allowing the user to view and change reports layout to produce different report views 141. Note that embodiments of the invention are not required to visually display the report views 141, and generation of the view 141 in one of the aforementioned output formats (e.g., HTML, XML, PDF, CSV, etc.) is sufficient to be considered "displaying" or "producing" the view for purposes of this invention since a browser or similar application actually renders the HTML version of the report view 141.

As will be explained shortly, embodiments of the invention allow the user 160 to provide changes 135 to customize or create new report definitions such as new or modified report layouts defined within core report definition files 121 without having to have knowledge about how the report views 141 are created. Embodiments of the invention provide a graphical user interface for this purpose as will be explained later. In this manner, embodiments of invention provide a powerful capability by allowing the user to create report layouts using existing report definitions as example templates or available report parameters without requiring intimate programming skills or knowledge about how a report view is generated from those report layouts created by the user 160.

FIGS. 3 through 7 are a single continuous flowchart of processing steps showing details performed by a report generator 150 configured to produce a storage area network resource management report (e.g., a report view 141) for presentation in a graphical user interface in accordance with example embodiments of invention. The flow chart in FIGS. 3 through 7 will be explained in reference to FIG. 1 and screenshot FIGS. 8 through 16.

Figure 3:
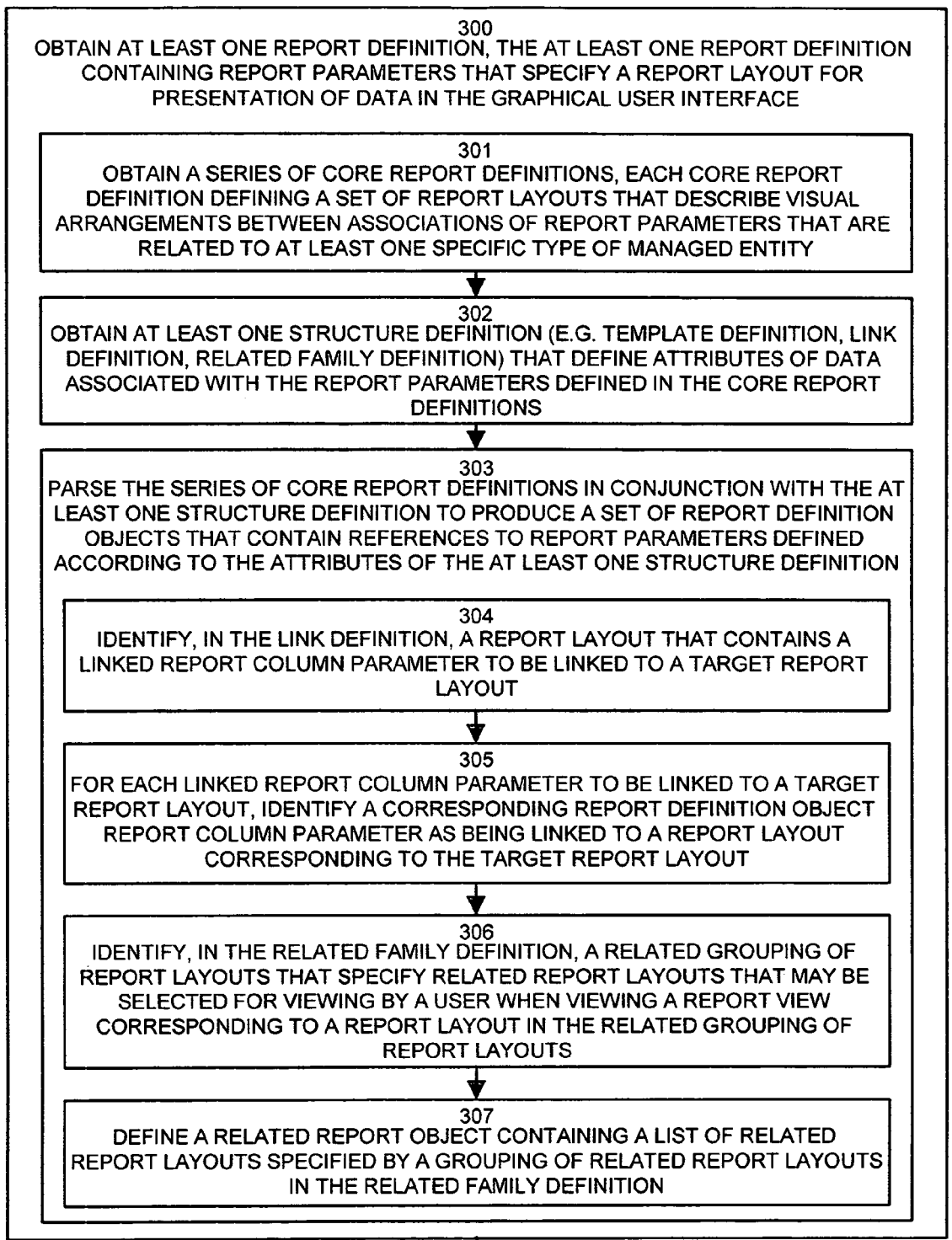
FIGS. 3 through 7 are a continuous flow chart of detailed processing steps performed by a report generator to produce report views in accordance with embodiments of invention.

In step 300 in FIG. 3, the report generator 150 obtains at least one report definition (e.g., 121-124). The report definition(s) as explained above (in step 200 in FIG. 2, for example) contain report parameters that specify one or more report layouts for presentation of data in a graphical user interface. Sub-steps 301 through 307 provide details of processing according to one example embodiment of invention to pre-process report definition files 121 through 124 prior to receiving a report request 134 from a user 160.

In step 301, the report generator 150 obtains a series of core report definitions 121. Each core report definition file 121 defines a set of one or more report layouts that describe visual arrangements between associations of report parameters that are related to at least one specific type of managed entity. Each report layout corresponds to a report view 141 that the user may select for generation. In the above XML example of the host core report definition file 121 (HostDef.xml), the single example report layout is labeled beginning at line 500 with the tag "ReportDefinition" and only one report definition or layout, "HostByGrp", is shown in that particular example. The report parameters are defined in lines 501 through 514 and define such things as columns in the report, the type of report (e.g., table, tree, chart, a combination of such, etc.), and so forth. The series of core report definitions define different report layouts for storage area network managed resources in one embodiment that are displayed as report selections 133 (i.e., one per report layout) and are selectable as report requests (e.g., 134 in FIG. 8) on the report selection interface 910 (FIG. 8).

In such embodiments, each report layout identifies arrangements of report parameters (e.g., as a table in the example ion FIG. 9) including a report name (e.g., displayed at location 920 in FIG. 9), report columns and characteristics of a report for a storage area network resource including at least one of a host computer system, a host file system, a storage array, a storage switch, and network attached storage and the like. Note that these categories of core report definitions are provided by way of example only and there may be more or less or different categories of core report definition files 121.

In step 302, the report generator 150 obtains at least one structure definition (i.e., one or more of the files 122 through 124) that defines attributes of data associated with the report parameters defined in the core report definitions 121.

In one embodiment of invention, structure definition(s) include a template definition 122 as explained above that defines report definition templates for each report layout defined in the series of core report definitions 121. Each report definition template contains metadata including column values (e.g., titles for the tops of columns that will contain data values extracted from the data set 110) and data types (e.g., character strings, numeric data types and so forth) for report columns identified in each report layout defined in the core report definition files 121. A template definition thus provides additional details or data concerning report parameters in the report layouts. Note that column name and data type are shown by way of example only and that there may be other template definition report parameters that further characterize information about a report layout. As an example, if one column in a report were to be shown as bold text, the area of the temple definition file 122 that contains template definition information for this report layout might include a bold tag or other notation to indicate that a particular column in that report layout is to be rendered in bold text.

In one embodiment of the invention, the structure definitions further include a link definition file 123 as explained above that defines linkable report columns and link targets for other report layouts defined in the core report definition files 121, thus allowing report dependencies to exist between reports layouts. This allows a user viewing one report view 141 to select a hyperlinked data value that causes generation and presentation of another report view 141.

Furthermore, the structure definitions can include a related family definition 124 as explained above that defines at least one related grouping of report layouts that specifies related report layouts that may be selected for viewing by a user when viewing a report view 141 corresponding to a report layout in the related grouping of report layouts. In this manner, embodiment of the invention provide a mechanism to associate groups of reports to each other to assist the user navigation between viewing of different reports that may be of interest to him or her.

Once the report generator 150 has identified the appropriate core report definitions and structure definition files, processing proceeds to convert this information into a set of report definition objects 131 for use by the report producer 130 during run-time execution. Sub-steps 303 through 307 explained processing performed to accomplish this task.

In step 303, the report generator 150 parses the series of core report definitions in conjunction with the at least one structure definition (e.g., 122 through 124) to produce a set of report definition objects that contain references to report parameters defined according to the attributes of the at least one structure definition. As an example, an XML parser such as SAX or a Document Object Model (DOM) XML processor can be used for this purpose.

In particular, in step 304, the report generator 150 identifies, in the link definition(s) 123, a report layout that contains a linked report column parameter (e.g., line 671 in the above example link definition 123) to be linked to a target report layout (e.g., line 672 in the above example).

In step 305, for each linked report column parameter (e.g., line 671 in line 675 in the above example) to be linked to a target report layout (e.g., line 672 in line 676), the report generator 150 identifies a corresponding report definition object report column parameter (e.g., line 673 in line 677) as being linked to a report layout corresponding to the target report layout. In other words, within a link definition file 123, the definition manager 120 operating within the report generator 150 identifies which columns are hyperlinks to other target report layouts.

Next, in step 306, the report generator 150 processes related family information by identifying, in the related family definition, a related grouping of report layouts (e.g., lines 683, 686 and 689 in the aforementioned related family example 124 above) that specify related report layouts that may be selected (e.g., from the pull-down menu) for viewing by a user when viewing a report view corresponding to a report layout in the related grouping of report layouts.

In step 307, the report generator 150 defines a related report object containing a list of related report layouts specified by a grouping of related report layouts in the related family definition. The related report object contains information to be displayed within a pull-down related report menu. Looking briefly ahead to FIG. 10, an example layout pull-down menu 945) shows a list of related reports 946 that are defined in an area of the related family structure definition file 124 associated with the displayed report view in FIG. 9. Note that the example related family file 124 shown above does not happen to correspond with the related report layout choices shown in the example pull-down menu 945 in the example screenshot in FIG. 9.

Figure 4:
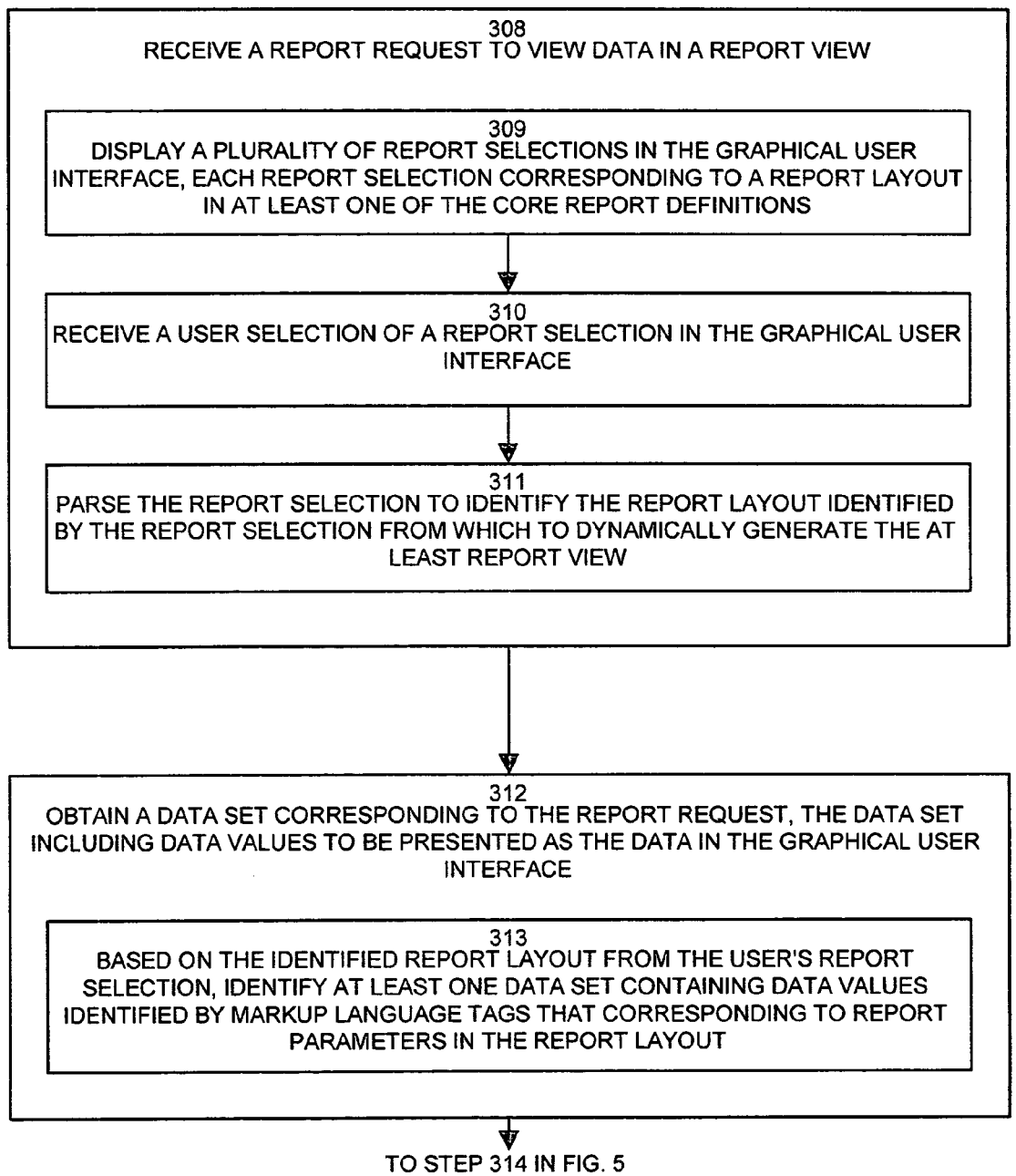

Returning attention back to FIG. 3, after processing of step 307 is complete, the processing of step 300 as performed by the definition manager 120 is complete and processing proceeds to step 308 at the top of the flowchart continuing in FIG. 4.

FIG. 4 is a continuation of the flowchart of processing steps from FIG. 3.

In step 308, the report generator 150 receives a report request 134 to view data in a report view. Details of this processing are explained in this example embodiment in steps 309 through 311.

In step 309, the report generator 150 displays a plurality of report selections 133 in the graphical user interface of the user computer system 170. As noted above, FIG. 8 shows an example of the report selection interface 910 that can be used for this purpose. Each report selection 133 corresponds to a report layout (i.e., ReportDefinition in the above example host core report definition file) in at least one of the core report definitions 121. Once the definition manager 120 has converted the report definitions to report definition objects 131 (FIG. 1), the report producer 130 can reference the appropriate report definition objects 131 that identify the various report layouts expressed within the core report definition files 121 and can produce a page such as an HTML page in FIG. 8 containing a list of report selections 133 available for selection by the user 160 interacting with the user computer system 170. Each report selection 133 corresponds to one of the report layouts defined in the core report definition files 121.

In step 310, the report generator 150 receives a user selection of a report request 134 (i.e., one of the displayed report selections 133) in (i.e., from) the graphical user interface. In the example in FIG. 8, the user selects the "All Hosts" report request 134. The report request 134 can be a hyperlink to a URL identifying the specific report layout and hence the specific report view 141 that the user 160 desires to access as corresponding to the particular report selection 133 chosen by that user 160.

In step 311, the report generator 150 parses the report request 134 to identify the specific report layout identified by the report selection 134 from which to dynamically generate the report view 141. At this point, the URL is processed (i.e., parsed) to identify the report layout to generate for the user.

In step 312, the report generator 150 obtains a data set 110 corresponding to the report request 134. The data set 110 includes data values (e.g., tagged via column tags as explained in the example data set snippet 110 above) to be extracted and presented as the data in the graphical user interface according to a format specified by the report layout and associated template, link and related family definition information. The report request 134 can specify the specific filename (e.g., within the URL) of the data set or, alternatively, the report request 134 can reference a specific report layout defined in a core report definition file 121 and the report layout itself can include, as a report parameter, the specification of one or more filenames or URLs identifying location(s) at which to obtain the appropriate data set(s) 110 for data values for this report.

In sub-step 313, the report generator 150, based on the identified report layout from the user's report selection request 134, identifies at least one data set 110 containing data values identified by markup language tags that corresponding to report parameters in the report layout. As explained with respect to the example data set 110 and host core report definition 121 shown above, in step 313 the report generator 150 can match report parameter column information from the report layout to column names in the row information within the data set 110 containing data related to the selected report layout to extract the appropriate data values. After processing of steps 312 and 313 is complete in FIG. 4, processing proceeds to step 314 at the top of the flowchart in FIG. 5.

Figure 5:
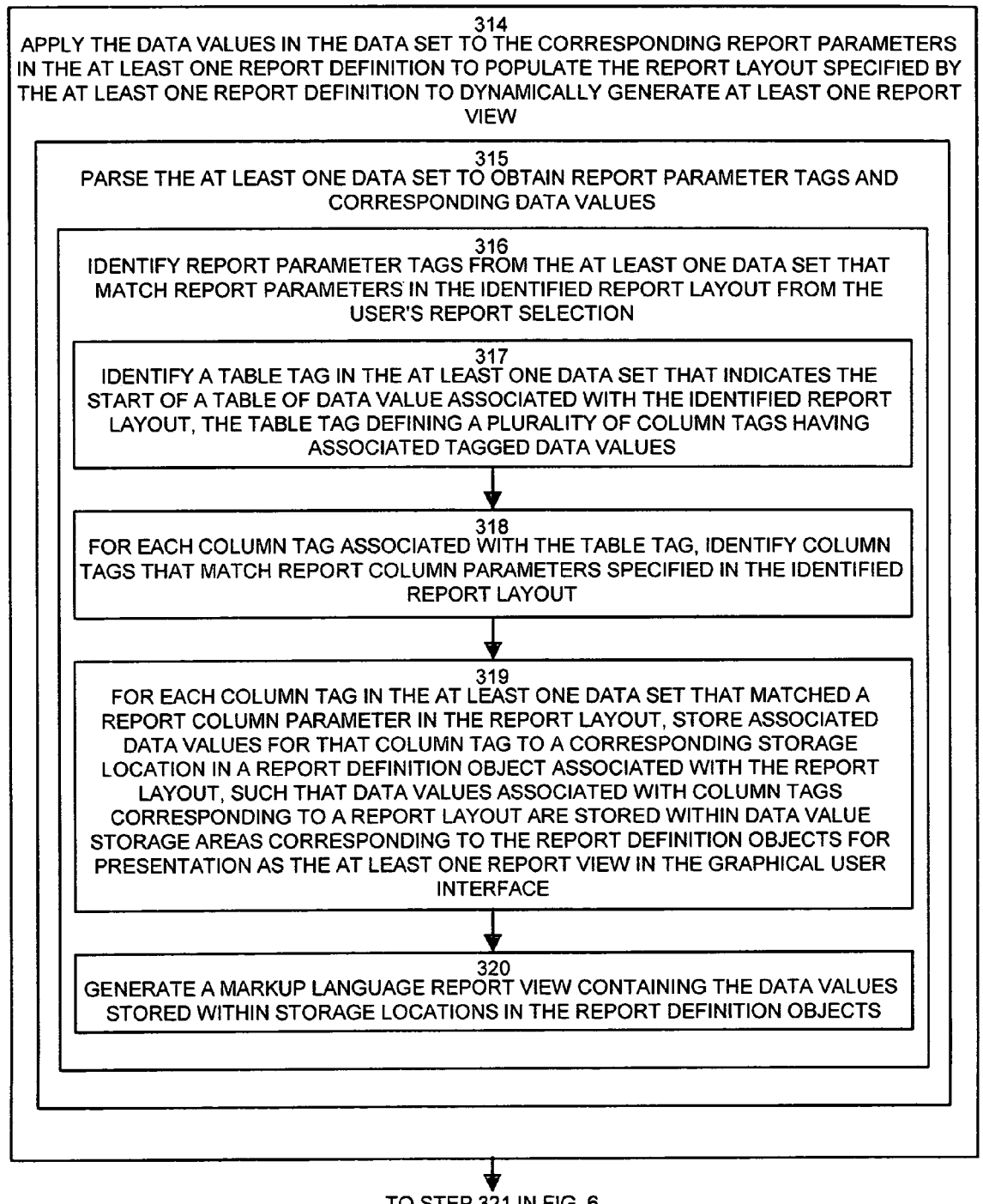

FIG. 5 is a continuation of the flowchart of processing steps from FIG. 4.

In step 314 in FIG. 5, the report generator 150 applies (i.e., matches, maps or extracts) the data values in the data set 110 to the corresponding report parameters in the report definition to populate the report layout (i.e., to populate report definition objects 131 that correspond to the report layouts) specified by the report definition to dynamically generate at least one report view 141. In other words, the report generator in steps 300 through 307 created a set of report definition objects 131 from parsing the report definition files 121 through 124. Now, in step 314, the report generator will parse the data sets 110 and will extract data values matching tags in the report layout of interest to populate the data structures in the report definition objects with data for the columns, rows, etc. for the report layout. Details of processing operations to perform this task are explained below with respect to sub-steps 315 through 321.

In step 315, the report generator 150 generally parses the data set(s) 110 to obtain report parameter tags and corresponding data values. Sub-steps 316 through 319 explain this processing of parsing a data set 110 to obtain tagged data values corresponding to report parameter tags in the report layout.

Specifically, in step 316, the report generator 150, during parsing, identifies report parameter tags (i.e., column tags of tagged data values) from the data set 110 that match report parameters (i.e., corresponding column tags) in the identified report layout from the user's report selection 134. Details of processing to match tags in this manner are explained below with respect to steps 317 through 319 for processing table data. It is to be understood that table data processing is explained by way of example only and embodiments of the invention are not limited to processing table or row set information.

In step 317, the report generator 150 identifies a table tag in the at least one data set 110 that indicates the start of a table of data values associated with the identified report layout (i.e., defined in the core report definition). The table tag defines a plurality of rows each having a set of column tags having associated tagged data values. An example of a table tag may be the ROWSET tag at line 700 or the ROW tag with an ID attribute at line 701 in the aforementioned example data set 110. These tags can identify the beginning of a row set of table data and each ROW tag indicates the start of a new row of data in the table. Prior to detecting an ending ROW tag indicating the end of a row, each tag after the starting ROW tag is a column identifier tag that indicates or encapsulates a data value for the column for that row in the table.

In step 318, for each column tag associated with the table tag, the report generator 150 identifies column tags that match report column parameters specified in the identified report layout. As an example, in the example host core report definition file 121 shown above, lines 508 through 514 indicate specific report column tags for which data values should be included within a report view being generated. Using the report column name column tags in quotes, such as "GRP_PARENT_ID" for column one of the report layout at line 508 in the above example, in step 318 the report generator 150 operates the report producer 130 to match this tag with a corresponding or matching column tag for each row in a table of data contained within the appropriate data set 110.

In step 319, for each column tag in the data set 110 that matches a report column parameter in the report layout, the report generator 150 obtains and stores an associated data value for that column tag to a corresponding storage location in a report definition object 131 associated with the report layout constructed from the core definition file 121. This processing is repeated such that all of the data values from the data set 110 associated with column tags corresponding to report parameters of a report layout are stored within data value storage areas corresponding to the report definition objects 131 for presentation as a report view 141 in the graphical user interface.

In step 320, the report generator 150 generates a markup language report view containing the data values stored within storage locations in the report definition objects 131 (e.g., generated HTML for each row). By repeating this processing for all matching column tags in the report layout, the report producer 130 can extract the appropriate data values for the data set 110 while dynamically generating the report view 141 in an appropriate output format such as XML, HTML, CSV or another appropriate output format of the user's choice. After processing of step 320 is complete processing proceeds to step 321 at the top of FIG. 6.

Figure 6:
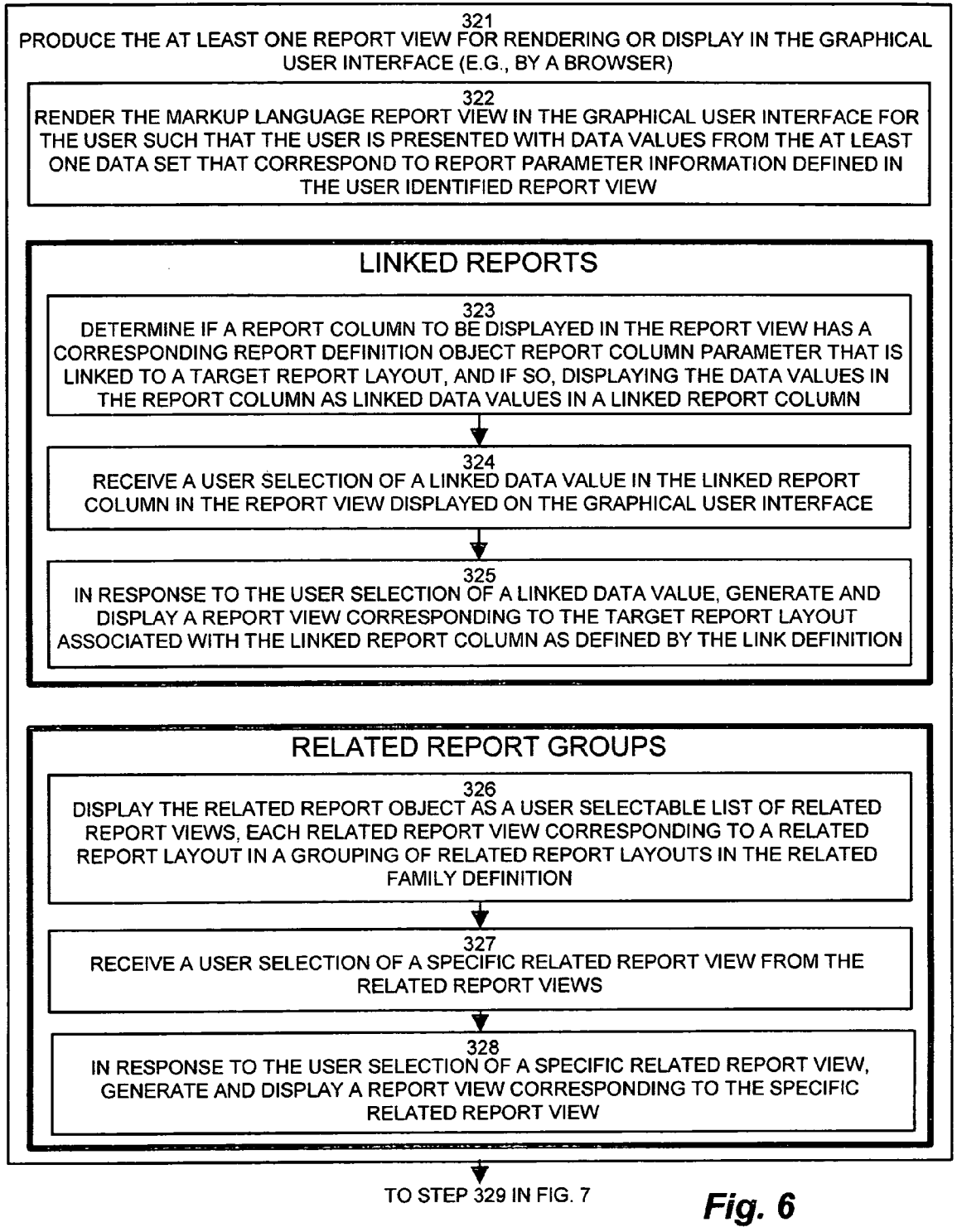

FIG. 6 is a flowchart that continues processing operations from the flowchart of processing steps discussed above in FIG. 5.

In step 321 in FIG. 6, the report generator 150 produces the at least one report view 141 for rendering or display in the graphical user interface (e.g., by a browser) of the user computer system 170 in example illustrated in FIG. 1.

In step 322, the report generator 150 renders the markup language report view 141 in the graphical user interface for the user 160 such that the user 160 is presented with data values from the data set 110 that corresponds to report parameter information defined in the user identified report view 141 (based on the user supplied report request 134). In this embodiment of step 322 then, the report generator 150 itself can display the report view. In alternative configurations, the report generator 150 produces the report view output 141 which is then received by another process such as a browser which actually displays the report view 141 to the user 160. Once the report view 141 is displayed, the user can operate features of embodiments of the invention such as linking to other reports, or navigating to related reports as explained below.

Steps 323 through 325 explained details of processing related to linking reports that allow a user to make a selection of a hyperlinked data value in one report that causes generation of a target report view for display to the user 160.

In step 323, the report generator 150 determines if a report column to be displayed in the report view 141 has a corresponding report definition object report column parameter that is linked to a target report layout (as explained above respect to the link structure definition file 123), and if so, displays the data values in the report column (in the report view 141) as linked (e.g., as hyperlinks) data values in a linked report column. In one embodiment of the intention, each data value in a particular linked column is displayed in underlined form and appears as a user-selectable hyperlink to the user 160 when displayed on the user computer system 170.

Next, in step 324, the report generator 150 receives a user selection of a linked data value in the linked report column in the report view 141 displayed on the graphical user interface. In the example interface shown in FIG. 9, the "File System-Total (GB)" column 927 is established as a linked column and each data value 928 for each host shown in that column is displayed as a hyperlink. While not shown in this example, the link definition file 123 for this report layout can specify that if the user selects on of these hyperlinked data values 928 in FIG. 9, the report generator will generate a target report layout that may correspond to, for example, the "File Systems" report selection 138 shown in FIG. 8. In other words, while viewing the "Hosts-Basic" report view 141 in FIG. 9, if the user 160 selects on the hyperlinked data values 928 in the column 927, the report generator can dynamically generate a target report layout specified in the link definition file for the "Hosts-Basic" report layout that causes generation of the "File Systems" report layout as if the user had returned to the screen in FIG. 8 and selection report selection 138. In this manner, embodiments of the invention assist the user in navigation between reports that may have or contain related information via linkability between reports.

In step 325, in response to the user selection of a linked data value (e.g., on of the data values 928 in FIG. 9), the report generator 150 generates and displays a new report view corresponding to the target report layout associated with the linked report column as defined by the link definition as explained above in the example link definition structure file 123. In this manner, embodiments of the invention allow a user to create link information within the link definition file 123 that allows information in one report layout to act as a hyperlink which, if selected by the user, causes dynamic generation of the target report view for display to the user.

Steps 326 through 328 explain processing details related to related report group processing that allows a user to quickly select report views 141 for any related report layouts that are related to the current report view 141 on display.

In particular, in step 326, the report generator 150 displays a related report object (containing a list of related report selections 133 as explained above) as a user selectable list (e.g., as a pull-down menu) of related report views. The example of this was explained briefly above with respect to the Layout pull-down menu 945 in FIG. 10. Each related report view 141 corresponds to a related report layout in a grouping of related report layouts in the related family definition 124 as explained above and is shown as a selected choice 946 in the Layout pull-down menu 945.

In step 327, the report generator 150 receives a user selection of a specific related report view 946 from the related report views pull-down menu 945 (i.e., the Layout menu).

In step 328, in response to the user selection of a specific related report view (i.e., selection of one of the report views 946 in FIG. 10), the report generator 150 generates and displays a report view 141 corresponding to the specific related report view as selected by the user. Generally, the processing involving step 328 repeats the overall processing to generate a new report view 141 as explained herein.

In one alternative configuration, if a related report view 946 selected by a user corresponds to a report view 141 that the report generator 150 recently generated for the same or a different user, one embodiment of the invention may cache or otherwise store recently created report views 141 for future use so that the entire process of report generation does not have to be repeated each time a report view is to be generated. The decision of whether or not to cache a specific report view 141 for future use can depend, for example, on how frequently data typically changes in a specific report view 141. For relatively static reports that contain data that does not change frequently (e.g., the data is same during the course of a day), the report generator 150 can generate the report view 141 once and can cache this view for a predetermined amount of time (i.e., less that the time during which data can change in the view) thus avoiding having to repeat the processing explained above to dynamically regenerate the report view 141 each time it is requested by a user 160.

Figure 7:
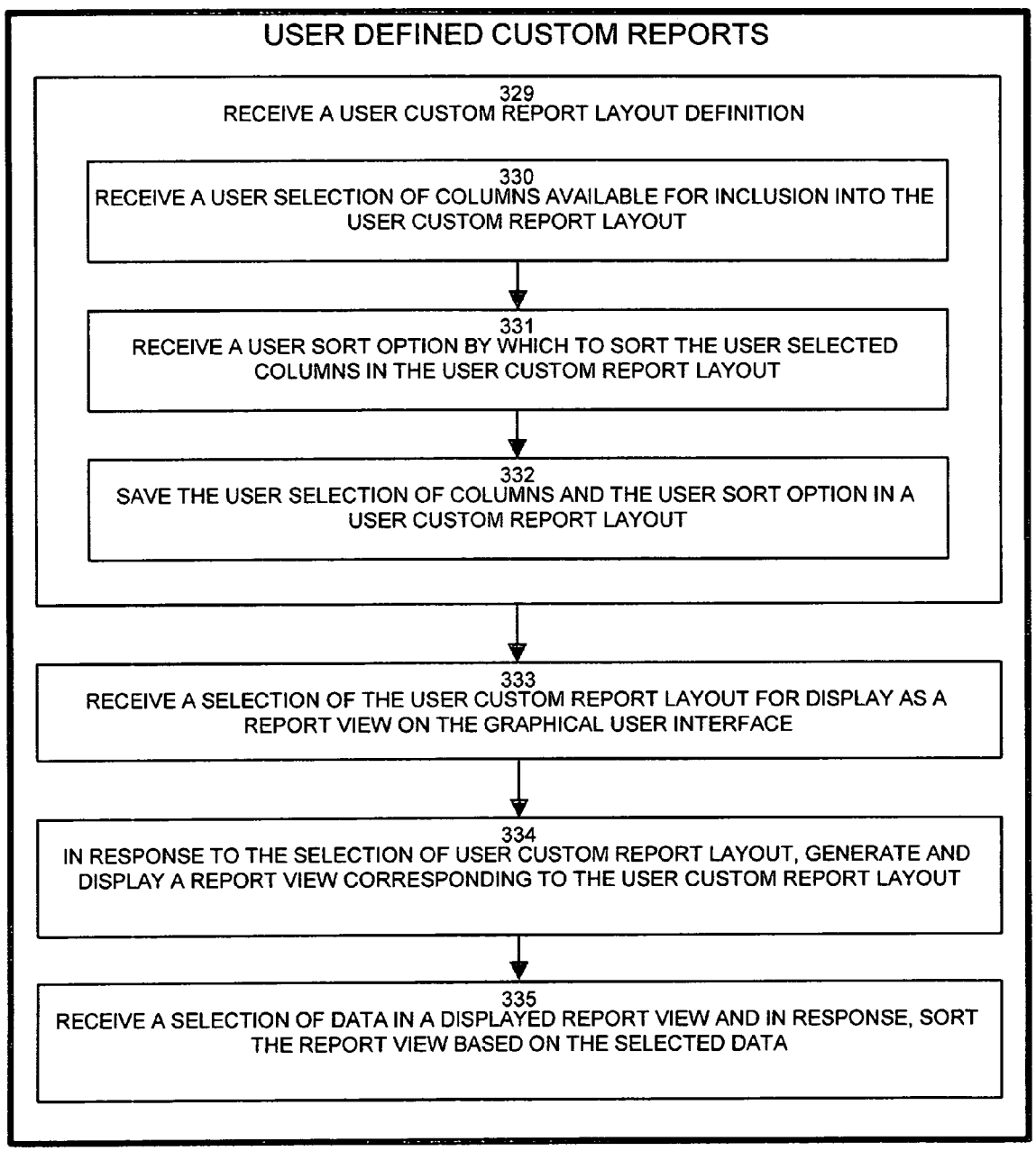
Figure 11:
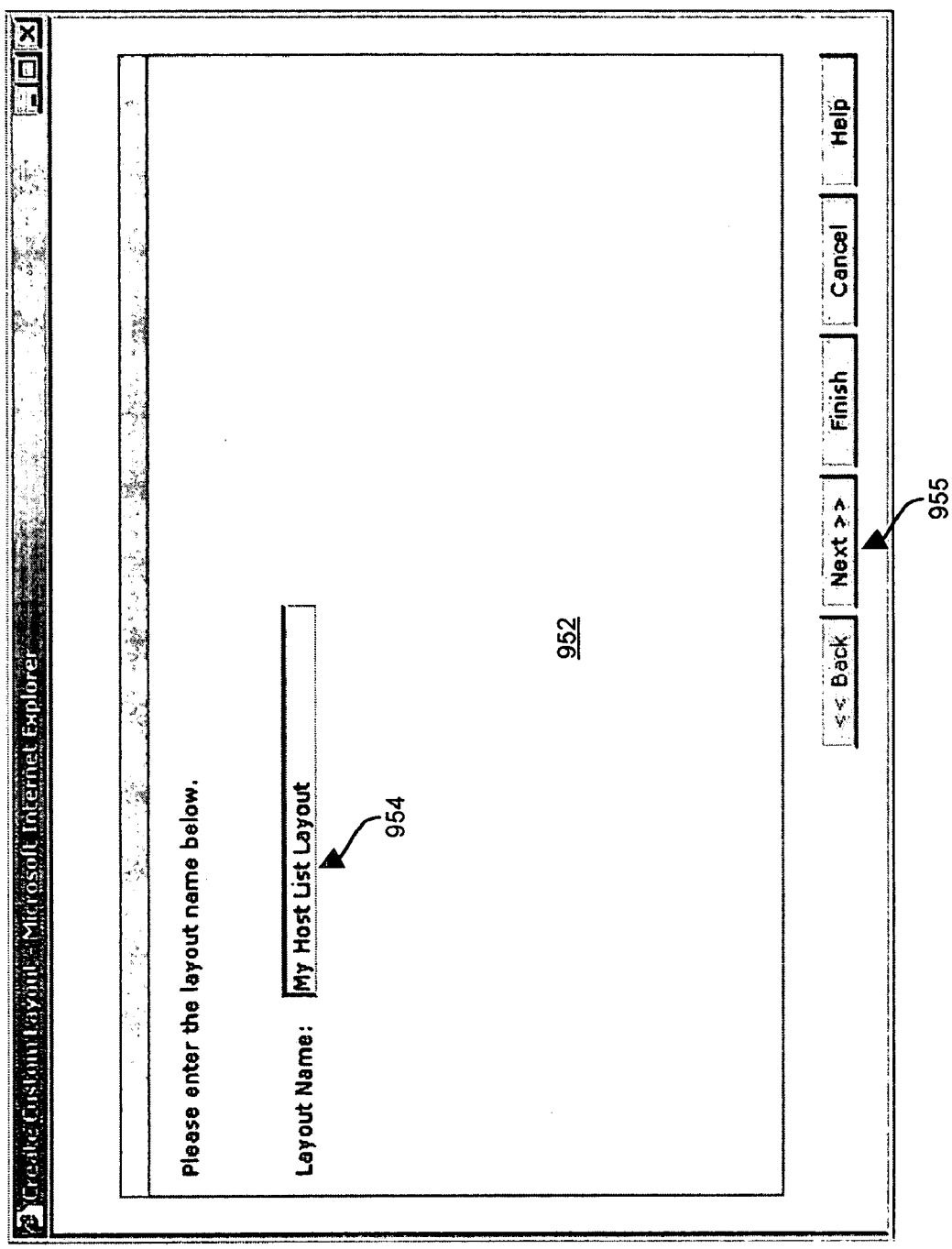
FIG. 11 is an example screen shot of a create-custom report interface configured in accordance with embodiments of the invention.
Figure 12:
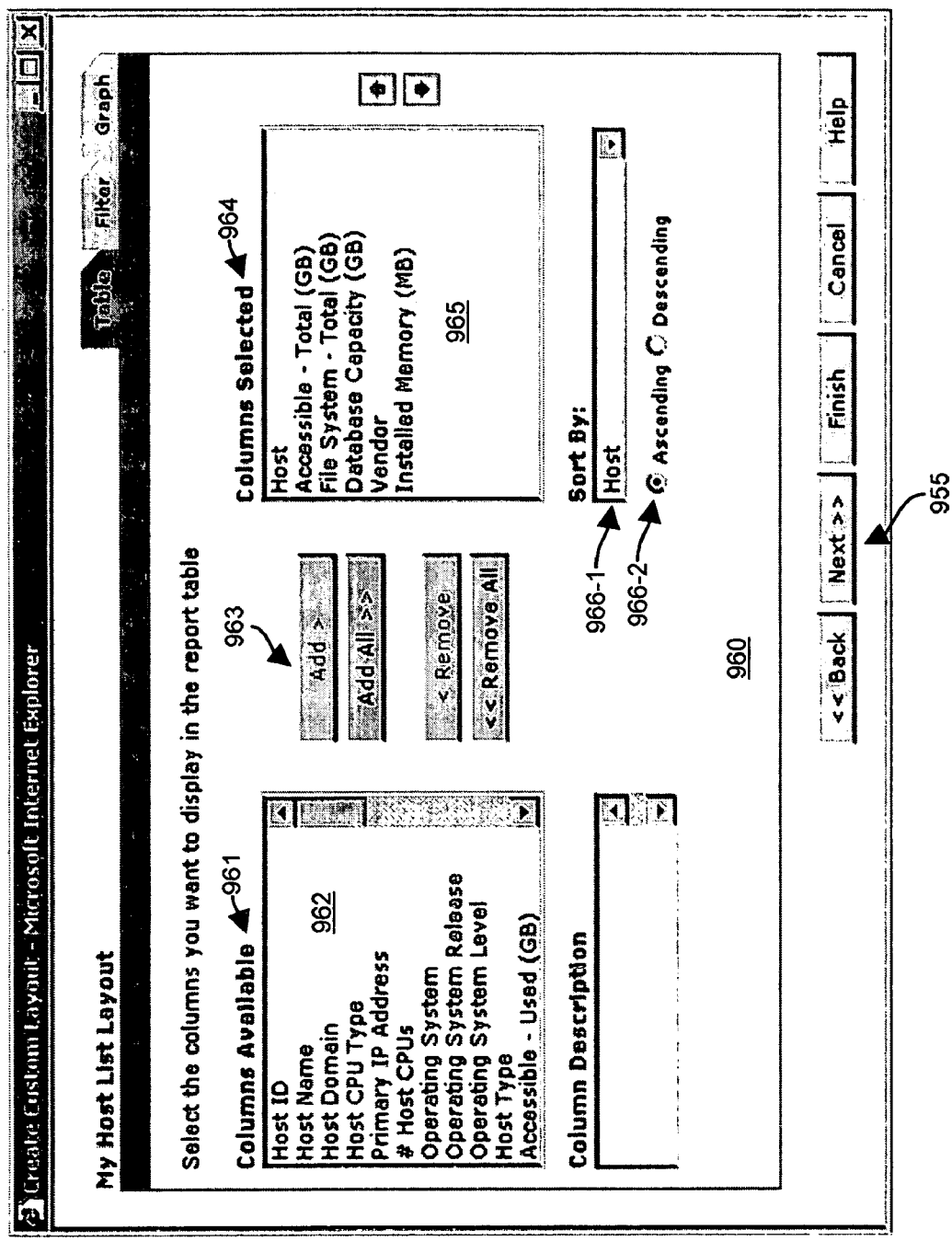
FIG. 12 is an example screen shot of a column selection interface configured in accordance with embodiments of the invention.
Figure 13:
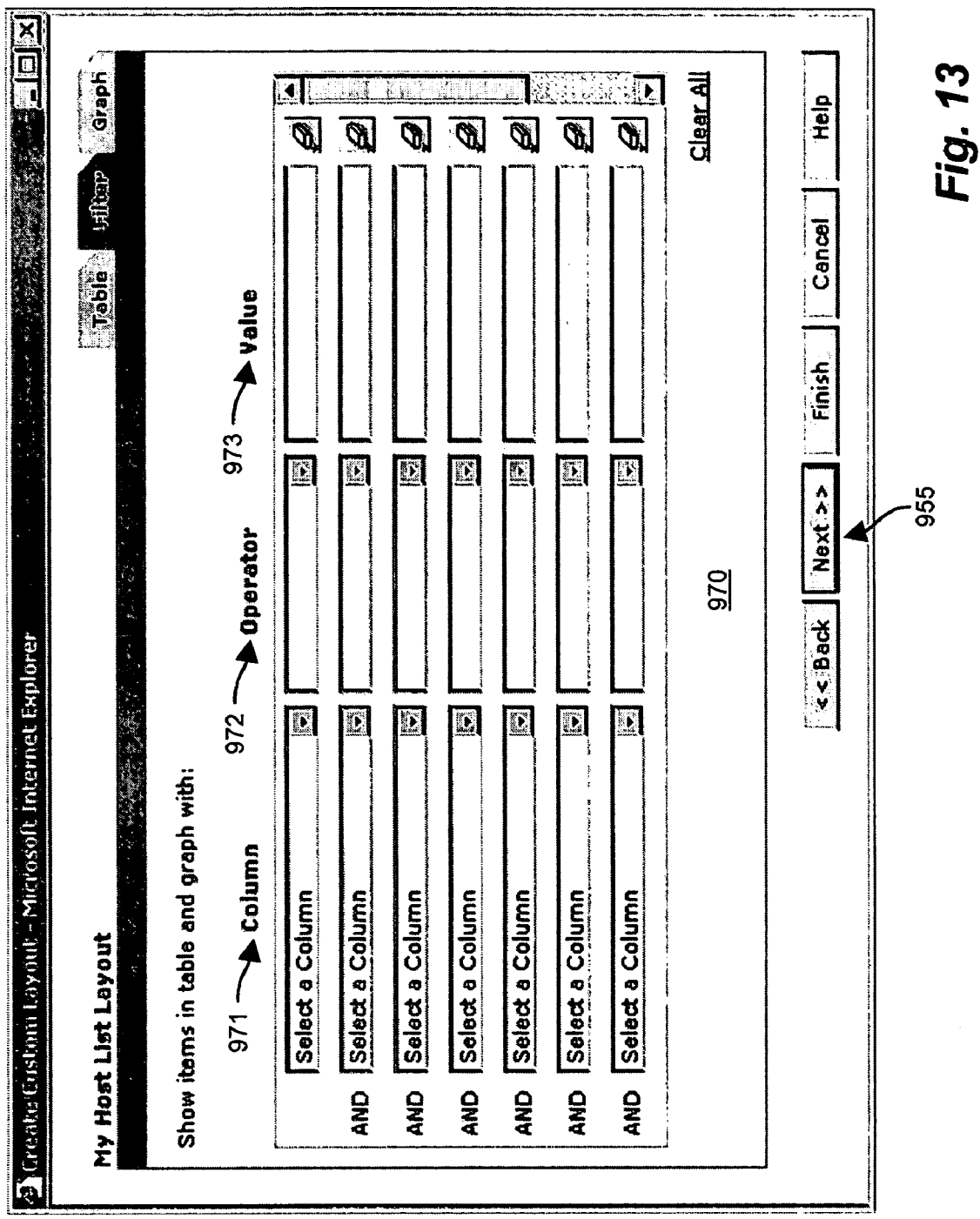
FIG. 13 is an example screen shot of a filter definition interface configured in accordance with embodiments of the invention.

Upon completion of step 328, processing can either return to step 300 in FIG. 3 or alternatively, if the user desires to create user-defined custom report layouts, processing can proceed to step 329 at the top of the flowchart shown in FIG. 7. For this example explanation, it will be assumed that the user does desire to create and display a user-defined custom report layout resulting in a custom user-defined report view 141 and thus processing proceeds to step 329 at the top of the flowchart FIG. 7.

FIG. 7 is a flowchart of processing steps illustrating processing details according to one embodiment of the invention to allow a user to create or define custom report layouts that produce custom user-defined report views 141. The processing details of FIG. 7 will be explained with respect to the screenshots if graphical user interfaces shown in FIGS. 10 through 15 that illustrate example operations performed by a user 160 on the user computer system 170 to define a custom report layout resulting in generation of a custom report view 141.

In step 329, the report generator 150 receives a user custom report layout definition. A custom report layout definition allows the user to select columns of interest to that user from available data set data for inclusion within a custom report view 141 defined by the user. Referring to FIG. 10, the user is able to create a new user layout by selecting the "Create New Layout" option 950 from the layout pull-down menu 945 that is available when viewing a report view 141. Invocation of the create new layout feature 950 causes the create custom layout introduction screen 952 in FIG. 11 to appear that allows the user 160 to enter a name or title for his or her custom layout at location 954. Once the user has entered a title 954 for the user-defined layout, the user can select the "Next" button 955 to advance to the column selection screenshot 960 shown in FIG. 12. Further details of his processing explained with respect to steps 330 through 332 in FIG. 7.

In step 330 in FIG. 7, the report generator 150 receives a user selection of columns of the available columns 962 (FIG. 12) for inclusion into the user-custom report layout being defined. In one embodiment, the list of available columns comes from the template definition file 122. As illustrated in the column selection screenshot 960 in FIG. 12, the columns available menu 961 provides a list of available column report parameters 962 (i.e., selectable columns). The user 160 can select desired columns and press the "Add" button 963 in order to have those columns listed in the columns selected menu 964. When the user has completed selecting a set of user-defined columns 965 (FIG. 12), processing proceeds to step 331.

In step 331 in FIG. 7, the report generator 150 receives a user sort option 966-1 and 966-2 (in FIG. 12) by which to sort the user selected columns set 965 in the user custom report layout being defined. When the column selection 965 and sort options 966 are complete, the user can press the "Next" button 955 to proceed to the screenshot illustrated in FIG. 13 that allows the user 160 to define filter options 970 for the custom report layout being defined by the user. To filter options 970 allow the user to select specific columns 971 upon which to apply an operator 972 in relation to a specific value 973 in order to produce a filtered report view 141. When any filter definitions are complete, the user can select the "Next" button 955 in FIG. 13 and processing proceeds to the graph definition screenshot 980 illustrated in FIG. 14.

Figure 14:
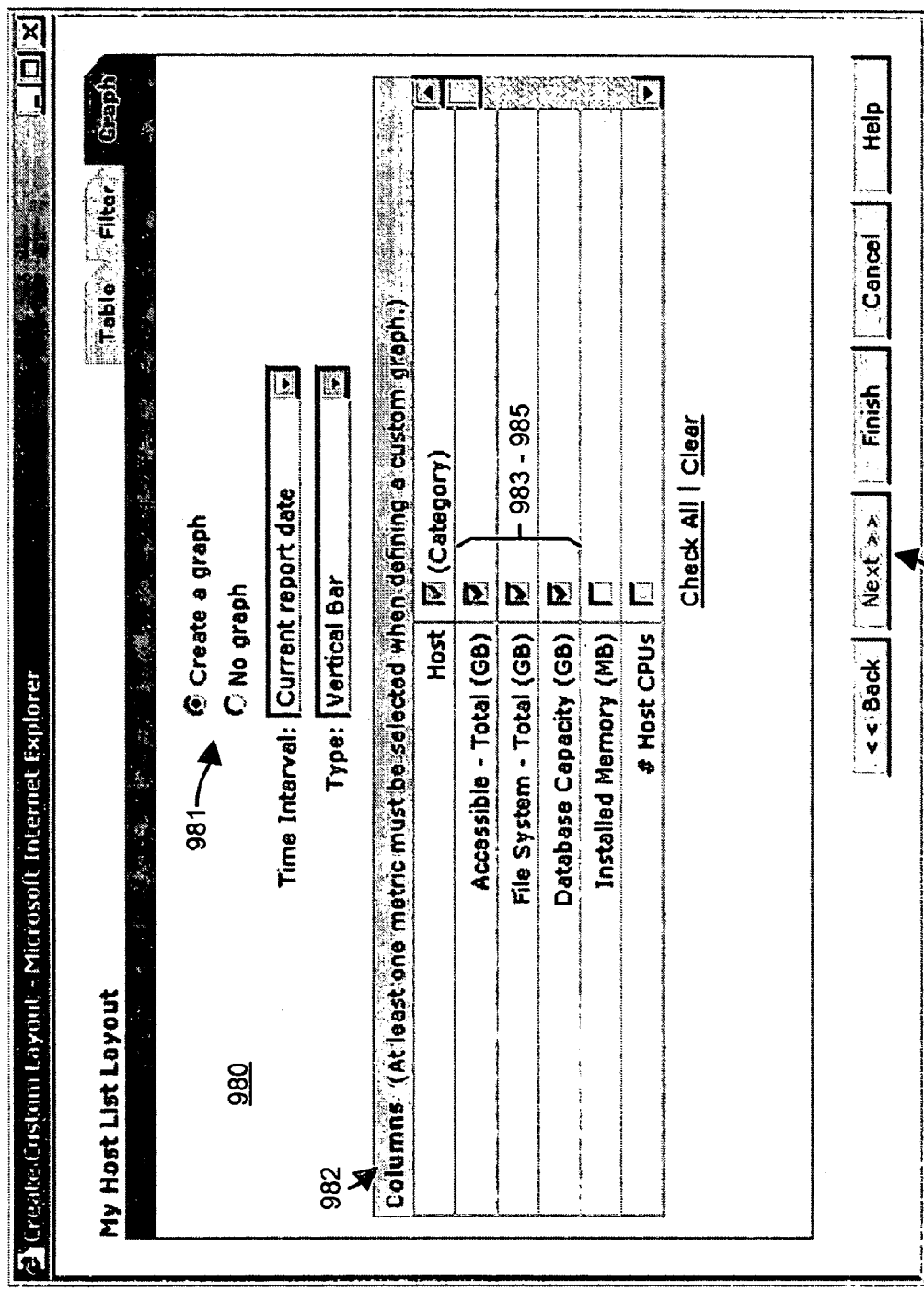
FIG. 14 is an example screen shot of a graph definition interface configured in accordance with embodiments of the invention.
Figure 16:
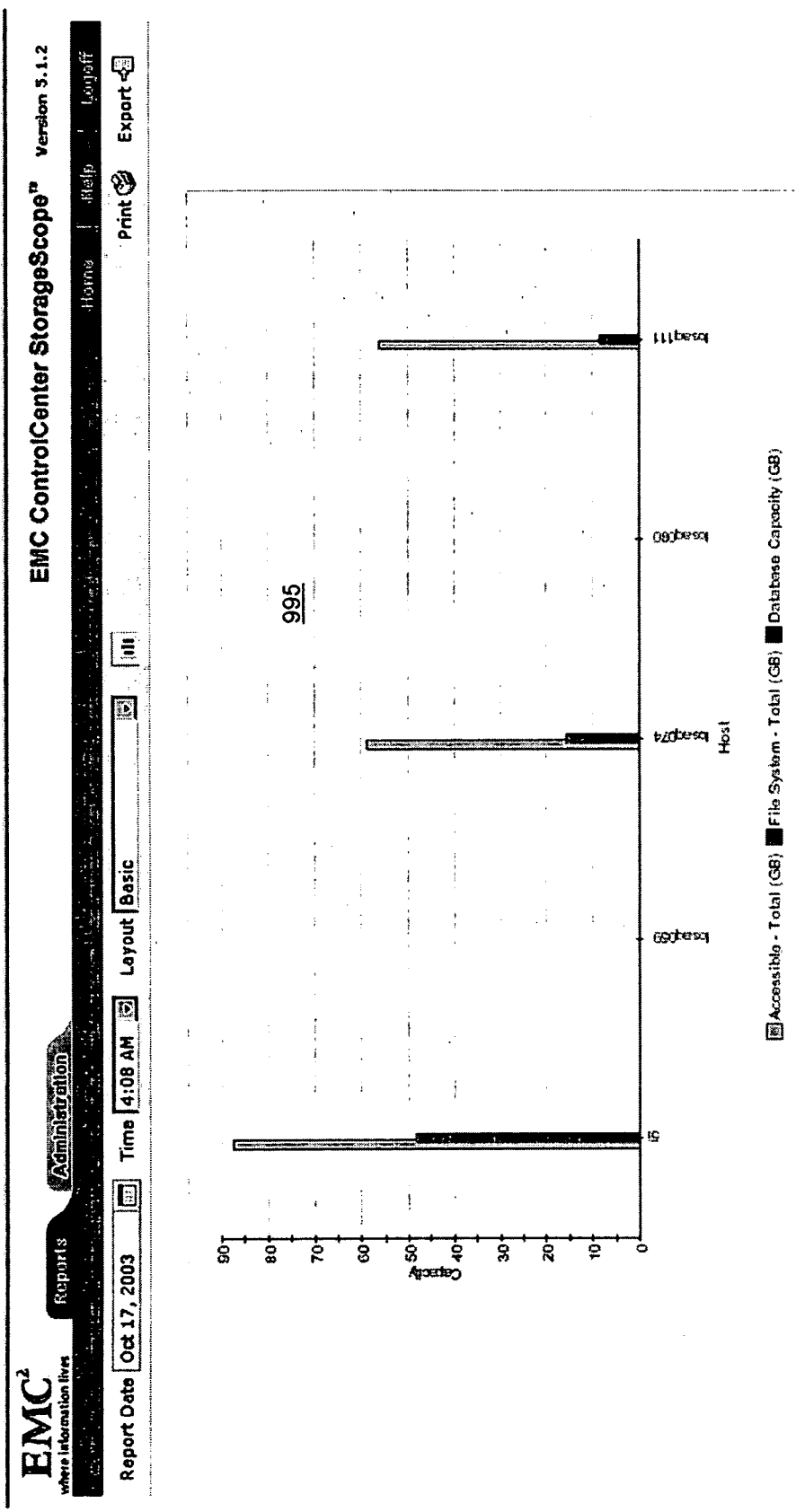
FIG. 16 is an example screen shot of a user-defined custom report view interface showing a graph view configured in accordance with embodiments of the invention.

The graph definition interface 980 in FIG. 14 allows the user to define whether or not the user-defined custom report view 141 will include a graph of the data or not at location 981 and further allows the user to indicate which columns of information at location 982 should be included within a graph, if selected. In this example, the user has indicated that a graph should be created ("Create a graph is selected at location 981) for the custom report view and that user has selected three columns 983 through 985 to be included in the graph. At this point, the user definition of the custom report view 141 is complete in the user can depress or select the "Next" button 955 to view user-defined custom report view 141 in either a table and/or graph format as shown in FIGS. 15 and 16. In response to selecting the next key 955, processing proceeds to step 332 in the flowchart in FIG. 7.

In step 332 in FIG. 7, the report generator 150 saves the user selection of columns and the user sort option (and filter options and graph information) in a user custom report layout within a user report definition file 121 (a core report definition file that can be used to store user-created report layouts). Thereafter, processing can return to the screen illustrated in FIG. 8 to allow the user to select his or her custom report for viewing. Alternatively, the report generator 150 can display the user defined report view after saving the user defined report layout.

Accordingly, in step 333 in FIG. 7, assuming the user desires to view his or her custom defined report layout, the report generator 150 receives a selection of the user custom report layout for display as a report view on the graphical user interface. The ability to select a custom report layout is shown, for example, in FIG. 10 in the Layout menu 945 where the user can select his or her own custom report layout entitled "My Host List Layout" at location 951.

In step 334, the report generator 150 in response to the selection of user custom report layout 951 (in FIG. 10 by way of example), generates and displays a user custom report view 990 as illustrated in FIG. 15 corresponding to the user custom report layout defined as explained above in FIGS. 10 through 14. As explained above, the selected column set 965 in FIG. 12 defines the columns 981 shown in the table view in the user custom report view 990 in FIG. 15. When viewing the custom report view 990 in FIG. 15, the user can select the graph option 992 and the report generator 150 will present the user with the user custom graph report view 995 as illustrated in FIG. 16. Note that the data in the graph 995 in FIG. 16 corresponds to the user-selected columns 983 through 985 selected in the graph definition screen 980 in FIG. 14 as explained above. In this manner, embodiments of the invention allow the user to produce a custom report layout that contains columns and/or graph information based on a user selection of data set data extracted from the repository 108 such as a managed object data repository produced from a storage area network management application.

In step 335, the report generator receives a selection of data in a report view 141 and in response, sorts the report view based on the selected data. As an example, in the report view 990 shown in FIG. 15, the user 160 can select any one of the columns 991 (e.g., by selecting the column titles or headings) and the report generator 150 will sort the table in the view 990 according to the data values in the selected column. This allows the user to dynamically adjust the report view 990 (or another view such as 141 in FIG. 9) to be displayed according to a sort preference supplied by the user 160.

Figure 17:
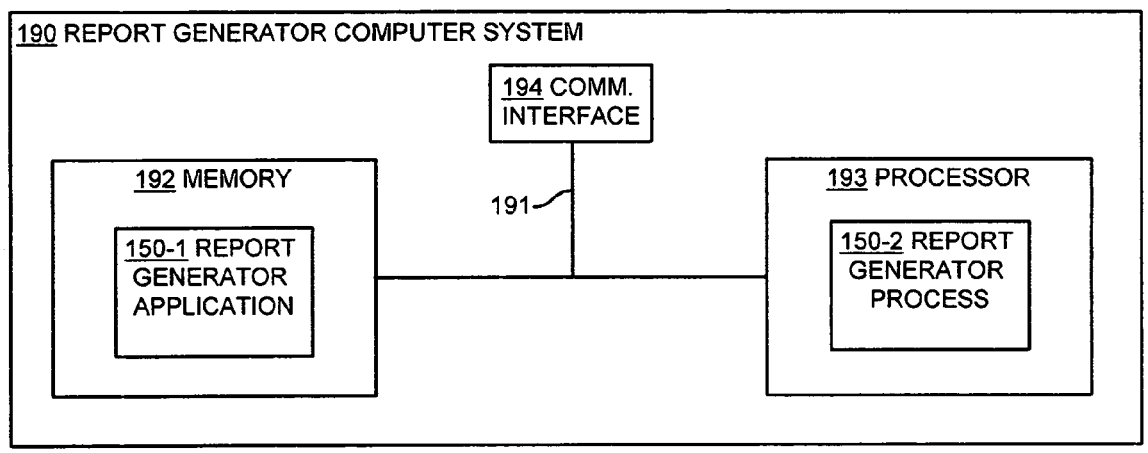
FIG. 17 is a block diagram of a report generator computer system architecture configured with a report generator application that can execute as a report generator process to perform processing operations of the report generator as explained herein in accordance with one example embodiment of the invention.

FIG. 17 illustrates an example architecture of a report generator computer system 190 in accordance with embodiments of the invention. The report generator computer system 190 may be any type of computerized system such as a personal computer, workstation, portable computing device, mainframe, server and/or the like. In couples a memory system 192, a processor 193, and a communications interface 194. The communications interface 194 allows the computer system 190 to communicate with the storage area network 100 and the user computer system 170 for display of report views 141 as explained herein. Alternatively, a display may be included as attached to the computer system 190 for display of report views 141 as explained herein.

The memory system 192 may be any type of computer readable medium that is encoded with a report generator application 150-1 that represents software code such as data and/or logic instructions (e.g., stored in the memory or on another computer readable medium such as a disk) that embody the processing functionality of embodiments of the invention for the report generator 150 as explained above. The processor 193 can access the memory system 192 via the interconnection mechanism 191 in order to launch, run, execute, interpret or otherwise perform the logic instructions of the report generator application 150-1 in order to produce a corresponding report generator process 150-2. In other words, the report generator process 150-2 represents one or more portions of the report generator application 150-1 performing (e.g., executing) within or upon the processor 193 in the report generator computer system 190. It is to be understood that the report generator 150 operating as explained in former embodiments is represented in FIG. 17 by any combination of the report generator application 150-1 and/or the report generator process 150-2 and/or the report generation computer system 190.

Is to be understood that embodiments of the invention include the report generator application 150-1 (i.e., the unexecuted or non-performing logic instructions and/or data) encoded within a fixed or removable computer readable medium such as a floppy disk, hard disk or in an optical medium, or in a memory system such as in firmware, read only memory (ROM), or, as in this example, as executable code within the memory system 192 (e.g., within random access memory or RAM). It is also to be understood that other embodiments of the invention provide the report generator application 150-1 operating within the processor 193 as the report generator process 150-2. While not shown in this example, those skilled in the art will understand that the computer system 190 may include other processes and/or software and hardware components, such as an operating system, which have been left out of this illustration for ease of description of the invention. Thus embodiments of the invention include the report generator program existing as either code in unexecuted form on a computer readable medium (e.g., as a software program on a transportable medium such as a CDROM) or as an executing software process or as a computer system configured to operate as explained herein.

Other embodiments of the invention include a template generator that has the ability to dynamically generate the template definition file 122 from table information stored in a database such as the managed object data repository 108. For each table in the repository database 108 that is to be used for report generation, that table can be prefix with a know identifier, and all table names with this identifier can be automatically processed to produce a list of all column names and data types and other template information (e.g., table name) such that the template is automatically generated. This can be useful to verify that the template has the most up-to-date database table information. In addition, automatic template generation can be used to validate the content of the report definitions to ensure that they reference valid column and table data. As an example, the template generator can validates which templates in Template.xml are not in the core report definition files and can validate Templates referenced in core report definition layouts but not in the Template file. In addition, the template generator can validate report columns in report definitions but not in the Template file and can validate valid links in report definitions (i.e. links that point to valid report definitions layouts).

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above. The report generator can operate on shared computing resources, or can be distributed among any number of computer systems. Furthermore, embodiments of the invention are not to be generally applicable to any type of application for which reports are to be generated from a collection of data. Accordingly, embodiments of the invention are not limited to the processing arrangements explained above.

What is claimed is:

1. A computer-implemented method for producing a storage area network resource management report view for presentation in a graphical user interface, the method comprising:

obtaining a series of core report definitions, each core report definition defining a set of report layouts that describe visual arrangements between associations of report parameters that are related to at least one specific type of managed entity;

obtaining at least one structure definition that defines attributes of data associated with the report parameters defined in the core report definitions, wherein the at least one structure definition further includes a link definition that defines linkable report columns and link targets for report layouts defined in the series of core report definitions allowing report dependencies to exist between report layouts;

parsing the series of core report definitions in conjunction with the at least one structure definition to produce a set of report definition objects that contain references to report parameters defined according to the attributes of the at least one structure definition;

displaying a plurality of report selections in the graphical user interface, each report selection corresponding to a report layout in at least one of the core report definitions;

receiving a user selection of a report selection in the graphical user interface; and parsing the report selection to identify the report layout identified by the report selection from which to dynamically generate the report view;

caching the report view for a predetermined amount of time upon determining that the frequency of data changes in the report view is below a predetermined threshold level;

obtaining a data set corresponding to the report layout identified by the report selection, the data set including data values to be presented as the data in the graphical user interface;

applying the data values in the data set to the report parameters corresponding to the report selection to populate the report layout identified by the report selection to dynamically generate the report view; and providing the at least one report view for rendering in the graphical user interface.

2. The method of claim 1 wherein:

the series of core report definitions define report layouts for storage area network managed resources, each report layout identifying arrangements of report parameters including a report name, report columns and characteristics of a report for a storage area network resource including at least one of a host computer system, a host file system, a storage array, a storage switch, and network attached storage.

3. The method of claim 1 wherein:

the at least one structure definition includes a template definition that defines report definition templates for each report layout defined in the series of core report definitions, each report definition template containing metadata including column values and data types for report columns identified in each report layout defined in the core report definition files.

4. The method of claim 1 comprising:

identifying, in the link definition, a report layout that contains a linked report column parameter to be linked to a target report layout;

for each linked report column parameter to be linked to a target report layout, identifying a corresponding report definition object report column parameter as being linked to a report layout corresponding to the target report layout;

and wherein providing the at least one report view for rendering in the graphical user interface comprises:

determining if a report column to be displayed in the report view has a corresponding report definition object report column parameter that is linked to a target report layout, and if so, displaying the data values in the report column as linked data values in a linked report column;

receiving a user selection of a linked data value in the linked report column in the report view displayed on the graphical user interface; and in response to the user selection of a linked data value, generating and displaying a report view corresponding to the target report layout associated with the linked report column as defined by the link definition.

5. The method of claim 4 further comprising providing a hyperlink from the linked report column parameter to the target report layout.

6. The method of claim 1 wherein the at least one structure definition further includes:

a related family definition that defines at least one related grouping of report layouts that specifies related report layouts that may be selected for viewing by a user when viewing a report view corresponding to a report layout in the related grouping of report layouts.

7. The method of claim 6 comprising:

identifying, in the related family definition, a related grouping of report layouts that specify related report layouts that may be selected for viewing by a user when viewing a report view corresponding to a report layout in the related grouping of report layouts;

defining a related report object containing a list of related report layouts specified by a grouping of related report layouts in the related family definition;

and wherein providing the at least one report view for rendering in the graphical user interface comprises:

displaying the related report object as a user selectable list of related report views, each related report view corresponding to a related report layout in a grouping of related report layouts in the related family definition;

receiving a user selection of a specific related report view from the related report views; and in response to the user selection of a specific related report view, generating and displaying a report view corresponding to the specific related report view.

8. The method of claim 1 wherein the core report definitions and at least one structure definition are constructed in a markup language.

9. The method of claim 1 wherein obtaining a data set corresponding to the report layout comprises:

based on the identified report layout from the user's report selection, identifying at least one data set containing data values identified by markup language tags that corresponding to report parameters in the report layout.

10. The method of claim 9 wherein applying the data values in the data set to the report parameters corresponding to the report selection to populate the report layout identified by the report selection to dynamically generate the report view comprises:

parsing the data set to obtain report parameter tags and corresponding data values; and during parsing, identifying report parameter tags from the data set that match report parameters in the identified report layout from the user's report selection, and for each matching report parameter and report parameter tag, storing a data value from the data set associated with that report parameter tag to a corresponding storage location in a report definition object associated with the report layout.

11. The method of claim 10 wherein identifying report parameter tags and storing a data value from the at least one data set associated with that report parameter tag comprises:

identifying a table tag in the at least one data set that indicates the start of a table of data value associated with the identified report layout, the table tag defining a plurality of column tags having associated tagged data values;

for each column tag associated with the table tag, identifying column tags that match report column parameters specified in the identified report layout; and for each column tag in the at least one data set that matched a report column parameter in the report layout, storing associated data values for that column tag to a corresponding storage location in a report definition object associated with the report layout, such that data values associated with column tags corresponding to a report layout are stored within data value storage areas corresponding to the report definition objects for presentation as the at least one report view in the graphical user interface.

12. The method of claim 11 wherein storing a data value from the at least one data set associated with that report parameter tag further comprises:

generating a markup language report view containing the data values stored within storage locations in the report definition objects; and wherein providing the at least one report view for rendering in the graphical user interface comprises:
rendering the markup language report view in the graphical user interface for the user such that the user is presented with data values from the at least one data set that correspond to report parameter information defined in the user identified report view.

13. The method of claim 1 comprising:
receiving a user custom report layout definition by performing the operations of:
receiving a user selection of columns available for inclusion into the user custom report layout;
receiving a user sort option by which to sort the user selected columns in the user custom report layout;
saving the user selection of columns and the user sort option in a user custom report layout;
receiving a selection of the user custom report layout for display as a report view on the graphical user interface; and
in response to the selection of user custom report layout, generating and providing a report view corresponding to the user custom report layout for display within a graphical user interface.

14. The method of claim 13 wherein receiving a selection of the user custom report layout for display as a report view on the graphical user interface comprises:
receiving a report view type selection specifying the report view to be presented including a graph.

15. The method of claim 14 wherein, in response to the selection of user custom report layout, generating and providing a report view corresponding to the user custom report layout for display within a graphical user interface comprises:
in response to receiving the report view type selection, displaying the data set as a graph.

16. The method of claim 1 wherein applying the data values in the data set to the report parameters corresponding to the report selection to populate the report layout identified by the report selection to dynamically generate the report view comprises:
extracting data values from the data set using at least one technique, the at least one technique including a markup language transformation processing technique;
processing the data values to produce a graphical view of relationships expressed within the data values, the graphical view including at least one of a tree view of relationships between the data values, a table view of the relationships between the data values, and a pictorial view of the relationships between the data values; and
storing the graphical view of the relationships as a report view file in a markup language format.

17. The method of claim 16 wherein the markup language format is at least one of
i) hypertext markup language;
ii) extensible markup language; and
iii) a comma separated value markup language.

18. The method of claim 16 comprising:
receiving a selection of data in a displayed report view;
sorting data in the displayed report view according to the selected data; and
causing the report view to be redisplayed according to the sorted data in the report view.

19. The computer system of claim 1 wherein the report generator process causes the computer system to perform the operations of:
identifying, in the link definition, a report layout that contains a linked report column parameter to be linked to a target report layout;
for each linked report column parameter to be linked to a target report layout, identifying a corresponding report definition object report column parameter as being linked to a report layout corresponding to the target report layout; and
wherein when the report generator process causes the computer system to perform the operation of providing the at least one report view for rendering in the graphical user interface, the report generator process causes the computer system to perform the operations of:
determining if a report column to be displayed in the report view has a corresponding report definition object report column parameter that is linked to a target report layout, and if so, displaying the data values in the report column as linked data values in a linked report column;
receiving a user selection of a linked data value in the linked report column in the report view displayed on the graphical user interface; and
in response to the user selection of a linked data value, generating and displaying a report view corresponding to the target report layout associated with the linked report column as defined by the link definition.

20. The method of claim 1 wherein the report parameters that specify a report layout for presentation are stored within the element data of an XML file.

21. The method of claim 1,
wherein applying the data values in the data set to the report parameters corresponding to the report selection to populate the report layout identified by the report selection to dynamically generate the report view comprises:
extracting data values from the data set using at least one technique, the at least one technique including a markup language transformation processing technique;
processing the data values to produce a graphical view of relationships expressed within the data values, the graphical view including at least one of a tree view of relationships between the data values, a table view of the relationships between the data values, and a pictorial view of the relationships between the data values; and
storing the graphical view of the relationships as a report view file in a markup language format.

22. A computer system comprising:
a memory;
a processor;
a communications interface;
an interconnection mechanism coupling the memory, the processor and the communications interface;
wherein the memory is encoded with a report generator application that when performed on the processor, provides a report generator process for producing a storage area network resource management report view for presentation in a graphical user interface, the report generator process causing the computer system to perform the operations of:
obtaining a series of core report definitions, each core report definition defining a set of report layouts that describe visual arrangements between associations of report parameters that are related to at least one specific type of managed entity;
obtaining at least one structure definition that defines attributes of data associated with the report parameters defined in the core report definitions, wherein the at least one structure definition further includes a link definition that defines linkable report columns and link targets for report layouts defined in the series of core report definitions allowing report dependencies to exist between report layouts;

parsing the series of core report definitions in conjunction with the at least one structure definition to produce a set of report definition objects that contain references to report parameters defined according to the attributes of the at least one structure definition;

displaying a plurality of report selections in the graphical user interface, each report selection corresponding to a report layout in at least one of the core report definitions;

receiving a user selection of a report selection in the graphical user interface;

parsing the report selection to identify the report layout identified by the report selection from which to dynamically generate the report view obtaining a data set corresponding to the report layout identified by the report selection, the data set including data values to be presented as the data in the graphical user interface;

caching the report view for a predetermined amount of time upon determining that the frequency of data changes in the report view is below a predetermined threshold level;

applying the data values in the data set to the report parameters corresponding to the report selection to populate the report layout identified by the report selection to dynamically generate the report view; and providing, via the communications interface, the at least one report view for rendering in the graphical user interface.

23. The computer system of claim 22 wherein:
the series of core report definitions define report layouts for storage area network managed resources, each report layout identifying arrangements of report parameters including a report name, report columns and characteristics of a report for a storage area network resource including at least one of a host computer system, a host file system, a storage array, a storage switch, and network attached storage.

24. The computer system of claim 22 wherein:
the at least one structure definition includes a template definition that defines report definition templates for each report layout defined in the series of core report definitions, each report definition template containing metadata including column values and data types for report columns identified in each report layout defined in the core report definition files.

25. The computer system of claim 22 wherein the at least one structure definition further includes:
a related family definition that defines at least one related grouping of report layouts that specifies related report layouts that may be selected for viewing by a user when viewing a report view corresponding to a report layout in the related grouping of report layouts.

26. The computer system of claim 25 wherein the report generator process causes the computer system to perform the operations of:
identifying, in the related family definition, a related grouping of report layouts that specify related report layouts that may be selected for viewing by a user when viewing a report view corresponding to a report layout in the related grouping of report layouts;
defining a related report object containing a list of related report layouts specified by a grouping of related report layouts in the related family definition; and
wherein when the report generator process causes the computer system to perform the operation of providing the at least one report view for rendering in the graphical user interface, the report generator process causes the computer system to perform the operations of:
displaying the related report object as a user selectable list of related report views, each related report view corresponding to a related report layout in a grouping of related report layouts in the related family definition;
receiving a user selection of a specific related report view from the related report views; and
in response to the user selection of a specific related report view, generating and displaying a report view corresponding to the specific related report view.

27. The computer system of claim 22 wherein the core report definitions and at least one structure definition are constructed in a markup language.

28. The computer system of claim 22 wherein when the report generator process causes the computer system to perform the operation of obtaining a data set corresponding to the report layout, the report generator process causes the computer system to perform the operation of:
based on the identified report layout from the user's report selection, identifying at least one data set containing data values identified by markup language tags that corresponding to report parameters in the report layout.

29. The computer system of claim 28 wherein when the report generator process causes the computer system to perform the operation of applying the data values in the data set to the report parameters corresponding to the report selection to populate the report layout identified by the report selection to dynamically generate the report view, the report generator process causes the computer system to perform the operations of:
parsing the data set to obtain report parameter tags and corresponding data values; and
during parsing, identifying report parameter tags from the data set that match report parameters in the identified report layout from the user's report selection, and for each matching report parameter and report parameter tag, storing a data value from the data set associated with that report parameter tag to a corresponding storage location in a report definition object associated with the report layout.

30. The computer system of claim 29 wherein when the report generator process causes the computer system to perform the operation of identifying report parameter tags and storing a data value from the at least one data set associated with that report parameter tag, the report generator process causes the computer system to perform the operations of:
identifying a table tag in the at least one data set that indicates the start of a table of data value associated with the identified report layout, the table tag defining a plurality of column tags having associated tagged data values;
for each column tag associated with the table tag, identifying column tags that match report column parameters specified in the identified report layout; and
for each column tag in the at least one data set that matched a report column parameter in the report layout, storing associated data values for that column tag to a corresponding storage location in a report definition object associated with the report layout, such that data values associated with column tags corresponding to a report layout are stored within data value storage areas corresponding to the report definition objects for presentation as the at least one report view in the graphical user interface.

31. The computer system of claim 30 wherein when the report generator process causes the computer system to perform the operation of storing a data value from the at least one data set associated with that report parameter tag further, the report generator process causes the computer system to perform the operation of:

generating a markup language report view containing the data values stored within storage locations in the report definition objects; and wherein when the report generator process causes the computer system to perform the operation of providing the at least one report view for rendering in the graphical user interface, the report generator process causes the computer system to perform the operation of:

rendering the markup language report view in the graphical user interface for the user such that the user is presented with data values from the at least one data set that correspond to report parameter information defined in the user identified report view.

32. The computer system of claim 22 wherein the report generator process causes the computer system to perform the operations of:

receiving a user custom report layout definition by performing the operations of:

receiving a user selection of columns available for inclusion into the user custom report layout;

receiving a user sort option by which to sort the user selected columns in the user custom report layout;

saving the user selection of columns and the user sort option in a user custom report layout; and wherein the report generator process causes the computer system to perform the operations of:

receiving a selection of the user custom report layout for display as a report view on the graphical user interface; and in response to the selection of user custom report layout, generating and providing a report view corresponding to the user custom report layout for display within a graphical user interface.

33. The computer system of claim 22 wherein when the report generator process causes the computer system to perform the operation of applying the data values in the data set to the report parameters corresponding to the report selection to populate the report layout identified by the report selection to dynamically generate the report view, the report generator process causes the computer system to perform the operations of:

extracting data values from the data set using at least one technique, the at least one technique including a markup language transformation processing technique;

processing the data values to produce a graphical view of relationships expressed within the data values, the graphical view including at least one of a tree view of relationships between the data values, a table view of the relationships between the data values, and a pictorial view of the relationships between the data values; and storing the graphical view of the relationships as a report view file in a markup language format.

34. The computer system of claim 33 wherein the markup language format is at least one of i) hypertext markup language;
ii) extensible markup language; and
iii) a comma separated value markup language.

35. The computer system of claim 33 wherein the report generator process causes the computer system to perform the operations of:

receiving a selection of data in a displayed report view;

sorting data in the displayed report view according to the selected data; and causing the report view to be redisplayed according to the sorted data in the report view.

36. The computer system of claim 22 wherein the report parameters that specify a report layout for presentation are stored within the element data of an XML file.

37. A computer program product having a computer-readable medium including computer program logic encoded thereon that, when executed on a computer system provides a method for producing a storage area network resource management report view for presentation in a graphical user interface by causing the computer system to perform the operations of:

obtaining a series of core report definitions, each core report definition defining a set of report layouts that describe visual arrangements between associations of report parameters that are related to at least one specific type of managed entity;

obtaining at least one structure definition that defines attributes of data associated with the report parameters defined in the core report definitions, wherein the at least one structure definition further includes a link definition that defines linkable report columns and link targets for report layouts defined in the series of core report definitions allowing report dependencies to exist between report layouts;

parsing the series of core report definitions in conjunction with the at least one structure definition to produce a set of report definition objects that contain references to report parameters defined according to the attributes of the at least one structure definition;

displaying a plurality of report selections in the graphical user interface, each report selection corresponding to a report layout in at least one of the core report definitions;

receiving a user selection of a report selection in the graphical user interface;

parsing the report selection to identify the report layout identified by the report selection from which to dynamically generate the report view obtaining a data set corresponding to the report layout identified by the report selection, the data set including data values to be presented as the data in the graphical user interface;

caching the report view for a predetermined amount of time upon determining that the frequency of data changes in the report view is below a predetermined threshold level;

applying the data values in the data set to the report parameters corresponding to the report selection to populate the report layout identified by the report selection to dynamically generate the report view; and providing the at least one report view for rendering in the graphical user interface.

38. A computer-implemented method for producing a storage area network resource management report view for presentation in a graphical user interface, the method comprising:

obtaining a series of core report definitions, each core report definition defining a set of report layouts that describe visual arrangements between associations of report parameters that are related to at least one specific type of managed entity;

obtaining at least one structure definition that defines attributes of data associated with the report parameters defined in the core report definitions, the at least one structure definition including a link definition that defines linkable report columns and link targets for report layouts defined in the series of core report definitions allowing report dependencies to exist between report layouts; and parsing the series of core report definitions in conjunction with the at least one structure definition to produce a set of report definition objects that contain references to report parameters defined according to the attributes of the at least one structure definition;

displaying a plurality of report selections in the graphical user interface, each report selection corresponding to a report layout in at least one of the core report definitions;

receiving a user selection of a report selection in the graphical user interface; and parsing the report selection to identify the report layout identified by the report selection from which to dynamically generate the report view;

caching the report view for a predetermined amount of time upon determining that the frequency of data changes in the report view is below a predetermined threshold level;

obtaining a data set corresponding to the report layout identified by the report selection, the data set including data values to be presented as the data in the graphical user interface; and applying the data values in the data set to the report parameters corresponding to the report selection to populate the report layout identified by the report selection to dynamically generate the report view, the step of applying the data values including extracting data values from the data set using at least on technique, the at least one technique including a markup language transformation processing technique.

* * * * *